(12) United States Patent
Kondoh et al.

(10) Patent No.: US 6,804,029 B2
(45) Date of Patent: Oct. 12, 2004

(54) LIQUID CRYSTAL SHUTTER

(75) Inventors: Shinya Kondoh, Nishitokyo (JP); Mie Ohara, Tokorozawa (JP)

(73) Assignee: Citizen Watch Co., Ltd., Tokyo (JP)

(*) Notice: Subject to any disclaimer, the term of this patent is extended or adjusted under 35 U.S.C. 154(b) by 403 days.

(21) Appl. No.: 09/959,912

(22) PCT Filed: Mar. 27, 2001

(86) PCT No.: PCT/JP01/02510
§ 371 (c)(1),
(2), (4) Date: Nov. 13, 2001

(87) PCT Pub. No.: WO01/73505
PCT Pub. Date: Oct. 4, 2001

(65) Prior Publication Data
US 2002/0158830 A1 Oct. 31, 2002

(30) Foreign Application Priority Data
Mar. 27, 2000 (JP) .......................................... 2000-85842

(51) Int. Cl.⁷ ........................ H04N 1/460; G06K 15/00; G03G 15/22; G03G 15/28
(52) U.S. Cl. ..................... 358/3.01; 358/3.08; 358/3.1; 399/139; 399/207
(58) Field of Search .............................. 358/3.01, 3.06, 358/3.08, 3.1; 399/139, 144, 207

(56) References Cited

U.S. PATENT DOCUMENTS

| 5,061,044 A | 10/1991 | Matsunaga ..................... 359/75 |
| 5,381,211 A * | 1/1995 | Godlove ...................... 399/159 |
| 5,541,747 A | 7/1996 | Nishi et al. .................... 359/56 |
| 5,565,995 A * | 10/1996 | Yamada et al. ............. 358/3.02 |
| 5,666,589 A * | 9/1997 | Yoshinaga et al. ............. 399/48 |
| 5,715,499 A * | 2/1998 | Yamazaki et al. ............. 399/50 |
| 5,786,879 A | 7/1998 | Kodera et al. ............... 349/134 |
| 5,977,940 A | 11/1999 | Akiyama et al. .............. 345/94 |
| 5,982,508 A * | 11/1999 | Kashihara ................... 358/3.08 |
| 6,266,115 B1 | 7/2001 | Fujikawa et al. ........... 349/133 |

FOREIGN PATENT DOCUMENTS

| EP | 0 875 881 Aw | 11/1998 |
| JP | 09203901 | 8/1997 |
| JP | 9-203901 | 8/1997 |
| JP | 2000019485 A | 1/2000 |
| WO | WO 97/08581 | 3/1997 |
| WO | 0 953 961 A2 | 11/1999 |
| WO | WO 99/66487 | 12/1999 |

OTHER PUBLICATIONS

Y. Asao et al., "Novel Ferroelectric Liquid Crystal Mode for Active Matrix Liquid Crystal Display Using Cholesteric–Chiral Smectic C Phase Transition Material," Jpn. J. Appl. Phys. vol. 38, (1999) pp. 5977–5983.*

* cited by examiner

Primary Examiner—Regina Liang
Assistant Examiner—Duc Q Dinh
(74) Attorney, Agent, or Firm—Finnegan, Henderson, Farabow, Garrett & Dunner, L.L.P.

(57) ABSTRACT

Disclosed is a liquid crystal shutter that uses as a shutter a liquid crystal panel constructed by sandwiching DHF liquid crystal between a pair of substrates provided with one or more pixel electrodes and one or more counter electrodes, wherein a driving waveform for the panel has a write period comprising two subfields. In each of the subfields, a single pulse is applied to a pixel, the single pulse applied in one subfield being opposite in polarity to the single pulse applied in the other subfield. On the other hand, a constant voltage of 0 V or close to 0 V is applied to the pixel during a period in which neither of the single pulses is applied.

16 Claims, 17 Drawing Sheets

LIQUID CRYSTAL SHUTTER

TECHNICAL FIELD

The present invention relates to a liquid crystal shutter that uses a liquid crystal panel as a shutter. More particularly, the invention relates to a liquid crystal shutter, suitable for use in a printer, that uses a deformed helical structure ferroelectric liquid crystal panel, V-shaped antiferroelectric liquid crystal panel, or monostable ferroelectric liquid crystal panel as a shutter.

BACKGROUND ART

A printer technology that uses a liquid crystal panel as a shutter for controlling light transmission by opening or closing in accordance with a data signal, and that forms an image corresponding to the data signal by projecting transmitted light onto a photoconductor is disclosed, for example, in Japanese Unexamined Patent Publication No. 2-227268 (by Sony).

FIG. 1 shows the operating principle of such a printer. The illuminating light source 1 comprises three primary colors of red (R), green (G), and blue (B) which are illuminated sequentially in a prescribed cycle. Illuminating light 2 is projected through a lens 3, and passed through or blocked by a liquid crystal shutter constructed from a liquid crystal panel; synchronized to the illuminating time of each of the R, G, and B colors, the shutter is opened or closed for a duration of time corresponding to image data. The liquid crystal shutter contains pixels corresponding to one line of data that a data signal outputs, and the light passed through the liquid crystal shutter is shone onto a photoconductor 5, i.e., photographic paper, to write one line of image data thereon. When the light of R, G, and B has been projected as described above, the photoconductor 5 is moved by one line, and light corresponding to the next line of data is projected. By writing image data line by line in this manner, an entire image is written onto the photographic paper 5. The time required to write the entire image is dependent on the time required to write one line, that is, the open/close speed of the liquid crystal shutter and the amount of the illuminating light 2. Reference character P indicates the moving direction of the photographic paper, i.e., the photoconductor.

Traditionally, liquid crystal materials such as STN and TN have been employed for liquid crystal shutters used in such printers.

The time required to write one image is dependent on the response speed of the liquid crystal shutter. When the conventional TN or STN liquid crystal element is used for the shutter for such a printer, it is difficult to raise the writing speed up to 1 ms, and it is therefore not possible to meet the market demand for faster image writing speeds. In view of this, deformed helical structure ferroelectric liquid crystal (hereinafter, referred to as "DHF liquid crystal"), V-shaped antiferroelectric liquid crystal, and monostable ferroelectric liquid crystal materials have been studied as new liquid crystal modes that can address such market demand.

The advantages that the above three modes have in common are that they exhibit fast response to pulse application, and that they provide the capability to display grayscale. However, since none of them has a memory capability, it has not been possible to use them for matrix liquid crystal displays other than active matrix displays that require the use of a switching device such as a TFT or MIM device at each pixel position.

On the other hand, in applications such as liquid crystal shutters for printers, since it is only necessary to control light for one line, the above-listed liquid crystal materials can be used without requiring the use of active devices. Furthermore, since they have no memory capability, they have the advantage that the liquid crystal can be driven using a simple waveform because the state of the liquid crystal can be controlled by just applying a pulse.

DISCLOSURE OF THE INVENTION

The DHF liquid crystal is thresholdless. The light transmittance of a DHF liquid crystal panel changes even when a very small amount of voltage is applied. Accordingly, the transmitting/non-transmitting state of the liquid crystal panel is determined based on whether or not a voltage is applied to an electrode. As a result, the active matrix type that directly drives each electrode has traditionally been employed for a liquid crystal panel that uses this type of liquid crystal. The inventor, however, has discovered a new driving method ideally suited for driving such a liquid crystal panel as a liquid crystal shutter using a pixel electrode and a counter electrode.

Each pixel is located at an intersection between the pixel electrode and the counter electrode, and the sum of the voltages applied to the pixel electrode and counter electrode is applied to the pixel. A write period is provided as a period for determining the transmittance (the amount of light transmission) of the pixel, and the voltage applied to the counter electrode is held constant at or near 0 V so that the amount of light transmission of the pixel is dependent only on the voltage applied to the pixel electrode. Further, the voltage to be applied to the pixel electrode is produced as a single pulse or a plurality of pulses and, to eliminate polarity skewness, each write period is divided into two subfields and the polarity of the single pulse or the plurality of pulses is reversed between the two subfields.

In the DHF liquid crystal panel, the amount of light transmission is controlled by utilizing the distortion of the helical structure of the liquid crystal. It is therefore desirable that the degree of the helical structure distortion be kept constant at all times so that the amount of light transmission can be controlled accurately. To achieve this, it becomes necessary to place the distortion of the helical structure in the same state each time a single pulse is applied to the pixel. Here, if the sum of the voltages applied to the pixel electrode and counter electrode is set to 0 V before applying a single pulse, since no voltage is applied within the DHF liquid crystal panel, the helical structure of the DHF liquid crystal stabilizes. That is, if the sum voltage is held constant at or near 0 V during each subfield period except the period that the single pulse is applied, the helical structure stabilizes during that subfield period, making it easier to control the amount of light transmission by the single pulse.

Further, for stabilization of the helical structure, it is preferable to increase the period during which the sum voltage is held constant at or near 0 V. To increase this period, it is desirable that the single pulse to be applied to the pixel electrode be always placed at the beginning or at the end of the subfield. This serves to increase the time interval between the application of one single pulse and the application of the next single pulse.

To ensure stabilization of the helical structure, a reset period during which the sum voltage is held constant at or near 0 V may be provided before or after the subfield. The provision of this reset period is particularly effective when the single pulse is not always placed at the beginning or at the end of the subfield.

It has also been discovered that the degree of the helical structure distortion for the magnitude of the applied voltage varies depending on the temperature of the DHF liquid crystal. Accordingly, for the optimum amount of light transmission, the width or height of the single pulse must be varied according to the temperature of the DHF liquid crystal panel. As the temperature of the DHF liquid crystal panel lowers, the degree of distortion of the DHF liquid crystal for the magnitude of the applied voltage decreases, and therefore the width or height of the single pulse should be increased. On the other hand, as the temperature of the DHF liquid crystal panel rises, since the degree of distortion of the DHF liquid crystal for the magnitude of the applied voltage increases, the width or height of the single pulse should be reduced.

The V-shaped antiferroelectric liquid crystal is also thresholdless. The light transmittance of a V-shaped antiferroelectric liquid crystal panel changes even when a very small amount of voltage is applied. Accordingly, the transmitting/non-transmitting state of the liquid crystal panel is determined based on whether or not a voltage is applied to an electrode. As in the case of the DHF liquid crystal panel, the inventor has discovered a new driving method ideally suited for driving such a V-shaped antiferroelectric liquid crystal panel as a liquid crystal shutter using a pixel electrode and a counter electrode.

On the other hand, the monostable ferroelectric liquid crystal has a threshold, and is placed in a transmitting state when a voltage of either positive or negative polarity is applied. Within a certain voltage range, the light transmittance of a monostable ferroelectric liquid crystal panel changes even when a very small amount of voltage is applied. As in the case of the DHF liquid crystal panel, the inventor has discovered a new driving method ideally suited for driving such a monostable ferroelectric liquid crystal panel as a liquid crystal shutter using a pixel electrode and a counter electrode.

More specifically, the liquid crystal shutter of the present invention can be summarized as follows.

The liquid crystal shutter of the present invention uses as a shutter a liquid crystal panel constructed by sandwiching a DHF liquid crystal between a pair of substrates provided with a pixel electrode and a counter electrode. The driving waveform for the panel has a write period consisting essentially of two subfields, in each of which a single pulse is applied to a pixel. The single pulse applied in one subfield is opposite in polarity to the single pulse applied in the other subfield. On the other hand, a constant voltage of 0 V or close to 0 v is applied to the pixel during a period in which neither of the single pulses is applied.

Alternatively, the liquid crystal shutter of the invention uses as a shutter a liquid crystal panel constructed by sandwiching a V-shaped antiferroelectric liquid crystal between a pair of substrates provided with a pixel electrode and a counter electrode. The driving waveform for the panel has a write period consisting essentially of two subfields, in each of which a single pulse is applied to a pixel. The single pulse applied in one subfield is opposite in polarity to the single pulse applied in the other subfield. On the other hand, a constant voltage of 0 V or close to 0 V is applied to the pixel during a period in which neither of the single pulses is applied.

In the V-shaped antiferroelectric liquid crystal panel, a pulse smaller in width and opposite in polarity to the single pulse may be applied immediately following each single pulse.

Alternatively, the liquid crystal shutter of the invention uses as a shutter a liquid crystal panel constructed by sandwiching a monostable ferroelectric liquid crystal between a pair of substrates provided with a pixel electrode and a counter electrode. The driving waveform for the panel has a write period consisting essentially of two subfields, in which a first single pulse for making a pixel transparent to light is applied at the end of the first subfield and a second single pulse, opposite in polarity to the first single pulse, for not making the pixel transparent to light is applied at the beginning of the second subfield. On the other hand, a constant voltage of 0 V or close to 0 V is applied to the pixel during a period in which neither of the single pulses is applied.

In the monostable ferroelectric liquid crystal panel, a pair of pulses consisting of a first single pulse for making the pixel transparent to light and a second single pulse, opposite in polarity to the first single pulse, for not making the pixel transparent to light may be applied in each of the subfields.

In each of the above-described liquid crystal shutters, the pixel electrode consists of a plurality of electrodes, and the counter electrode consists of one electrode. In this case, a single pulse is applied to the pixel electrode, a constant voltage of 0 V or close to 0 V is applied to the counter electrode, and a sum voltage representing the sum of the voltages applied to the both electrodes is applied to the pixel.

The single pulse is applied at the beginning or at the end of each of the subfields, and the amount of light transmission of the liquid crystal panel is controlled by controlling the width or height of the single pulse.

Instead of the single pulse, one or more than one pulse may be applied to the pixel in each subfield, and the amount of light transmission of the liquid crystal panel is controlled by controlling the number of pulses applied.

A reset period during which the sum voltage applied to the pixel is held constant at or near 0 V may be provided immediately preceding the write period.

The liquid crystal panel is provided with a temperature sensor and a device for varying the width or height of the single pulse in accordance with a change in the temperature of the liquid crystal panel. This device increases the width or height of the single pulse when the temperature of the liquid crystal panel lowers, and reduces the width or height of the single pulse when the temperature of the liquid crystal panel rises.

Similarly, the liquid crystal panel is provided with a device for varying the number of pulses in accordance with a change in the temperature of the liquid crystal panel, and the device increases the number of pulses when the temperature of the liquid crystal panel lowers, and reduces the number of pulses when the temperature of the liquid crystal panel rises.

Further, the liquid crystal shutter of the invention can be used in a printer that is equipped with a liquid crystal shutter using a liquid crystal panel as a shutter for controlling light transmission by opening or closing in accordance with a data signal, and that forms an image corresponding to the data signal by projecting transmitted light onto a photoconductor.

DETAILED DESCRIPTION OF THE INVENTION

[Ferroelectric Liquid Crystal Called DHF Type Panel]

Figure 2:
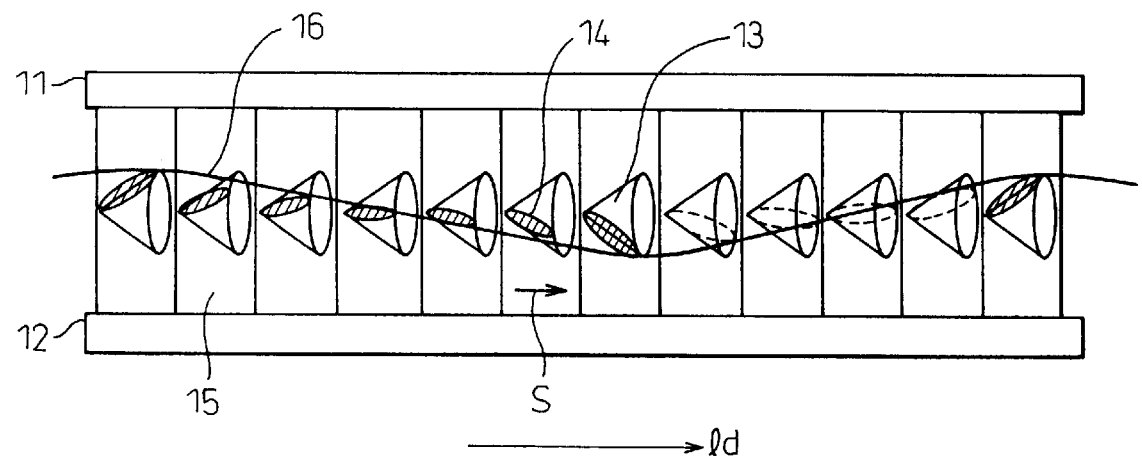
FIG. 2 is a diagram schematically showing the inside of a liquid crystal panel constructed using DHF liquid crystal.

Generally, a ferroelectric liquid crystal molecule moves in such a manner as to rotate around the surface of a cone known as a liquid crystal cone. FIG. 2 is a diagram schematically showing the inside of a liquid crystal panel constructed using a DHF liquid crystal material. It is known that when this ferroelectric liquid crystal is injected so as to be sandwiched between a pair of substrates, the liquid crystal cones 13 align themselves with the base of each cone oriented perpendicularly to the substrates 11 and 12, thereby forming smectic layers 15, as shown in FIG. 2. In actuality, a plurality of liquid crystal cones are arranged within each smectic layer, but in FIG. 2, only one liquid crystal cone is shown within each smectic layer. Noting the liquid crystal cones aligned in a direction parallel to the substrates, it is seen that a helical structure 16 is formed with the ferroelectric liquid crystal molecules 14 gradually rotating around the surfaces of the liquid crystal cones 13.

It is known that when ferroelectric liquid crystal is injected by setting the gap between the two substrates to a few microns, the helical structure of the ferroelectric liquid crystal disappears. Conventional liquid crystal devices using ferroelectric liquid crystals are constructed so that the liquid crystal does not exhibit such a helical structure. However, if a ferroelectric liquid crystal is used having a characteristic whereby the distance it takes for the liquid crystal molecules to rotate one full turn in the helix is very short (this distance is hereafter described as the "helical pitch"), the liquid crystal assumes a state in which the helical structure does not disappear, as shown in FIG. 2. The ferroelectric liquid crystal material having such a very short helical pitch is called ferroelectric liquid crystal called DHF type material.

When a DHF liquid crystal panel constructed by sandwiching the DHF liquid crystal material between the pair of substrates is viewed from above the upper substrate, the average optical axis direction ld is substantially parallel to the smectic layer normal S. However, when a voltage is applied forming an electric field directed perpendicular to the substrates 11 and 12, the helical structure 16 is distorted, as a result of which the average optical axis direction 1d is tilted away from the direction parallel to the smectic layer normal S. The direction of tilt is dependent on the polarity of the applied voltage, while the angle of tilt is dependent on the magnitude of the applied voltage.

Figure 3:
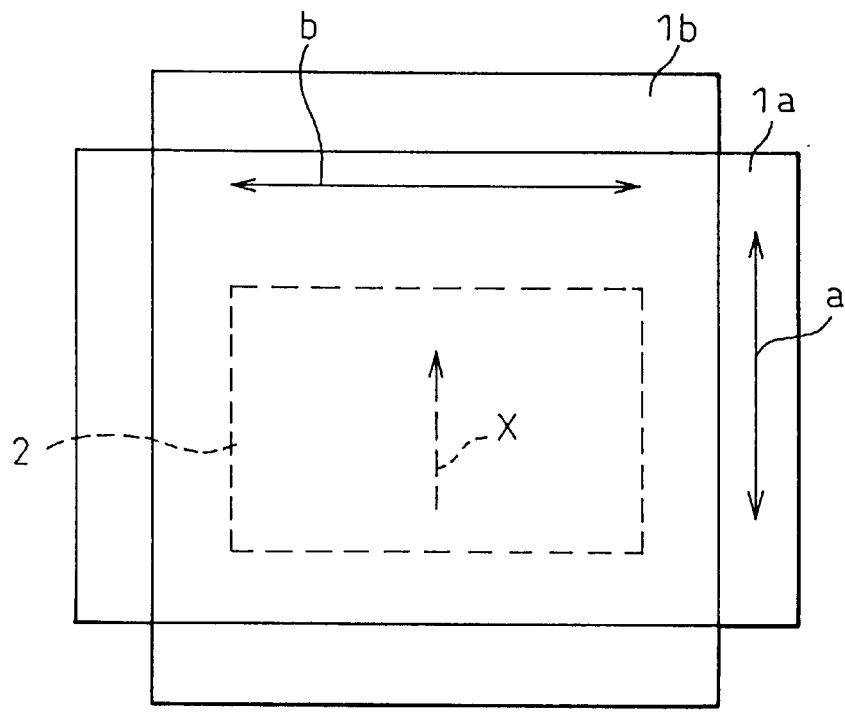
FIG. 3 is a diagram showing a typical arrangement of polarizers in the liquid crystal panel constructed using the DHF liquid crystal.

FIG. 3 is a diagram showing a typical arrangement of polarizers in the liquid crystal panel constructed using the DHF liquid crystal material. As shown, the liquid crystal cell 2 is placed between the polarizers 1a and 1b whose polarization axes a and b are arranged in a crossed Nicol configuration, the liquid crystal cell being set up so that the direction of the smectic layer normal of the DHF liquid crystal shown in FIG. 2, that is, the average long axis direction X of the DHF liquid crystal molecules in the absence of an applied voltage, is substantially parallel to the polarization axis of either one of the polarizers, and so that it can produce a white display state (transmission state) and a black display state (non-transmission state).

Figure 4:
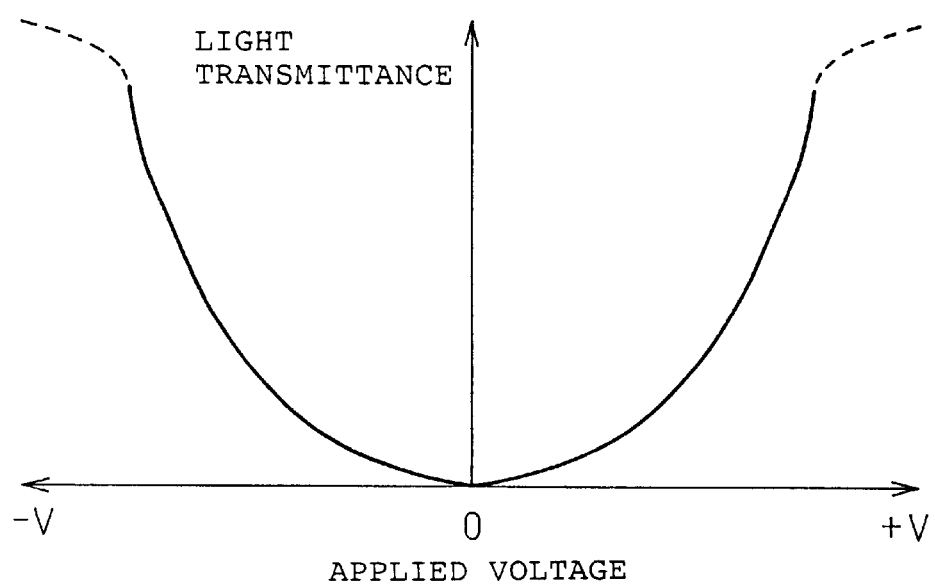
FIG. 4 is a diagram showing an applied voltage versus transmittance relationship for the DHF liquid crystal panel.

FIG. 4 is a diagram showing how the transmittance varies with the applied voltage when the voltage is applied to the liquid crystal panel of the above construction. As earlier described, distortion of the helical structure of the DHF liquid crystal causes the optical axis direction to change, thus causing the transmittance to change. Accordingly, the DHF liquid crystal panel has no threshold, and exhibits the unique property wherein even the slightest change in the applied voltage causes a change in the transmittance. As can be seen from the applied voltage versus transmittance relationship shown in FIG. 4, the transmittance increases with increasing applied voltage and decreases with decreasing applied voltage. The transmittance curve is substantially symmetrical between the opposite voltage polarities. Here, the applied voltage can be interchanged with the width of the applied pulse, the height of the pulse, or the number of pulses applied.

Liquid crystal displays constructed by combining such DHF liquid crystal with an active matrix liquid crystal panel are disclosed, for example, in Japanese Patent Application Nos. 08-507907 (by Philips) and 07-097611 (by Casio Computer).

[V-shaped Antiferroelectric Liquid Crystal Panel]

Figure 5:
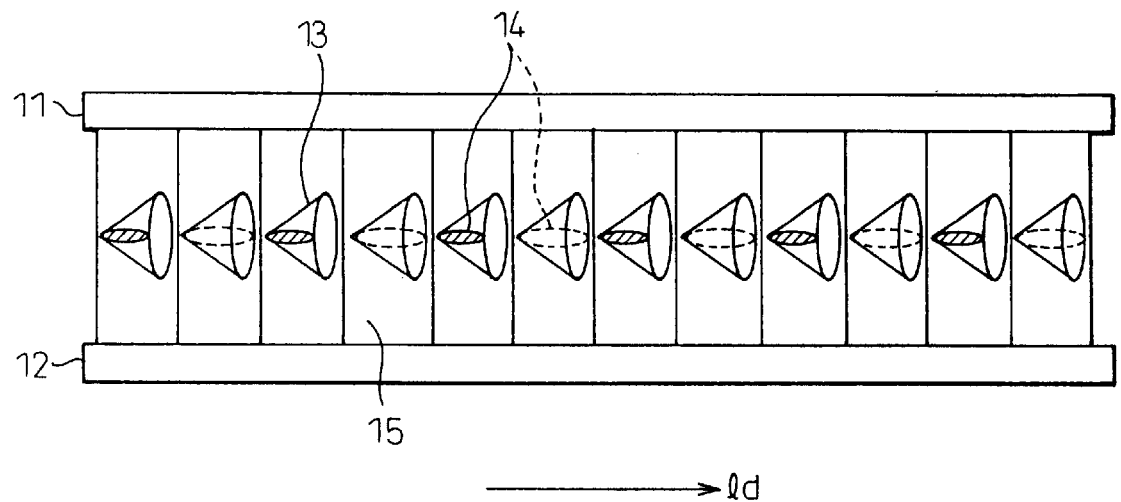
FIG. 5 is a diagram schematically showing the inside of a liquid crystal panel constructed using V-shaped antiferroelectric liquid crystal.

FIG. 5 is a diagram schematically showing the inside of a liquid crystal panel constructed using a V-shaped antiferroelectric liquid crystal material. Noting the liquid crystal cones 13 aligned in a direction parallel to the substrates 11 and 12, it is seen that the antiferroelectric liquid crystal molecules 14 are alternately lying on the opposite sides of the respective liquid crystal cones, that is, first on this side of one cone, then on the other side of the next cone, and so on. As a result, as shown in FIG. 5, when viewed from above the upper substrate, the orientation of the average optical axis direction ld is the same as that seen in the liquid crystal panel constructed using the DHF liquid crystal material.

Figure 6:
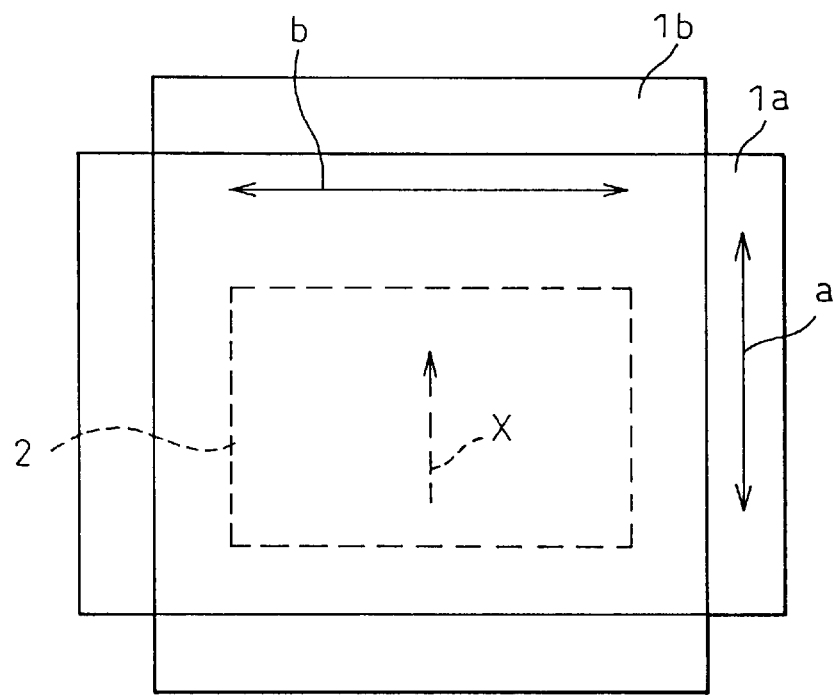
FIG. 6 is a diagram showing a typical arrangement of polarizers in the liquid crystal panel constructed using the V-shaped antiferroelectric liquid crystal.

FIG. 6 is a diagram showing a typical arrangement of polarizers in the liquid crystal panel constructed using the V-shaped antiferroelectric liquid crystal material. As shown, the liquid crystal cell 2 is placed between the polarizers 1a and 1b whose polarization axes a and b are arranged in a crossed Nicol configuration, the liquid crystal cell being set up so that the average long axis direction X of the V-shaped antiferroelectric liquid crystal molecules in the absence of an applied voltage is parallel to the polarization axis of either one of the polarizers, and so that it can produce a white display state (transmission state) and a black display state (non-transmission state).

Figure 7:
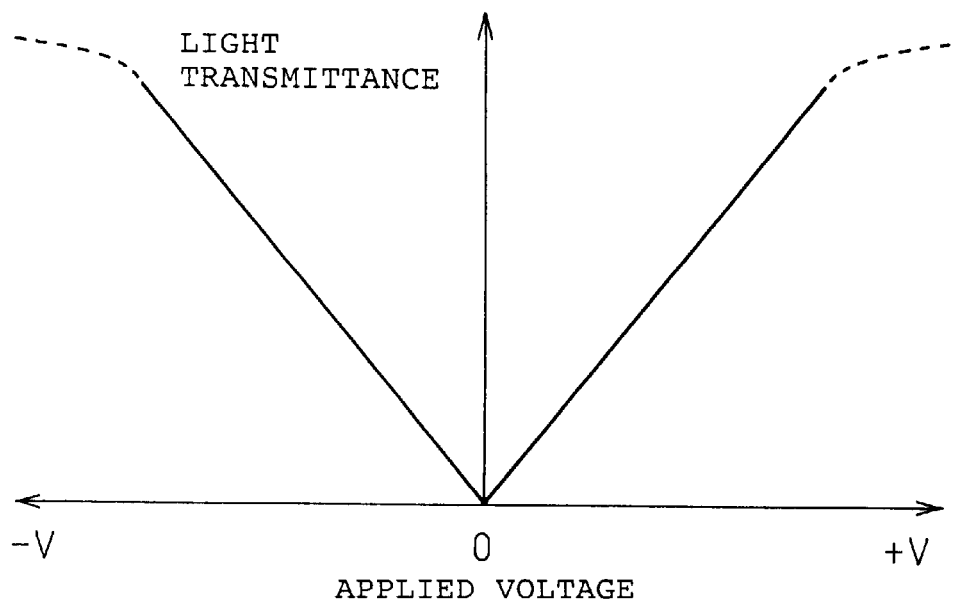
FIG. 7 is a diagram showing an applied voltage versus transmittance relationship for the V-shaped antiferroelectric liquid crystal panel.

FIG. 7 is a diagram showing how the transmittance varies with the applied voltage when the voltage is applied to the V-shaped antiferroelectric liquid crystal panel of the above construction. When the voltage is applied, the liquid crystal molecules begin to move proportionally to the magnitude of the applied voltage. As shown in FIG. 7, the V-shaped antiferroelectric liquid crystal panel, unlike conventional antiferroelectric liquid crystals, has no threshold, and its transmittance changes even when a very small amount of voltage is applied, and varies linearly with the applied voltage. As can be seen from the applied voltage versus transmittance relationship shown in FIG. 7, the transmittance increases with increasing applied voltage and decreases with decreasing applied voltage. The transmittance curve is substantially symmetrical between the opposite voltage polarities. Here, the applied voltage can be interchanged with the width of the applied pulse, the height of the pulse, or the number of pulses applied.

[Monostable Ferroelectric Liquid Crystal Panel]

Figure 8:
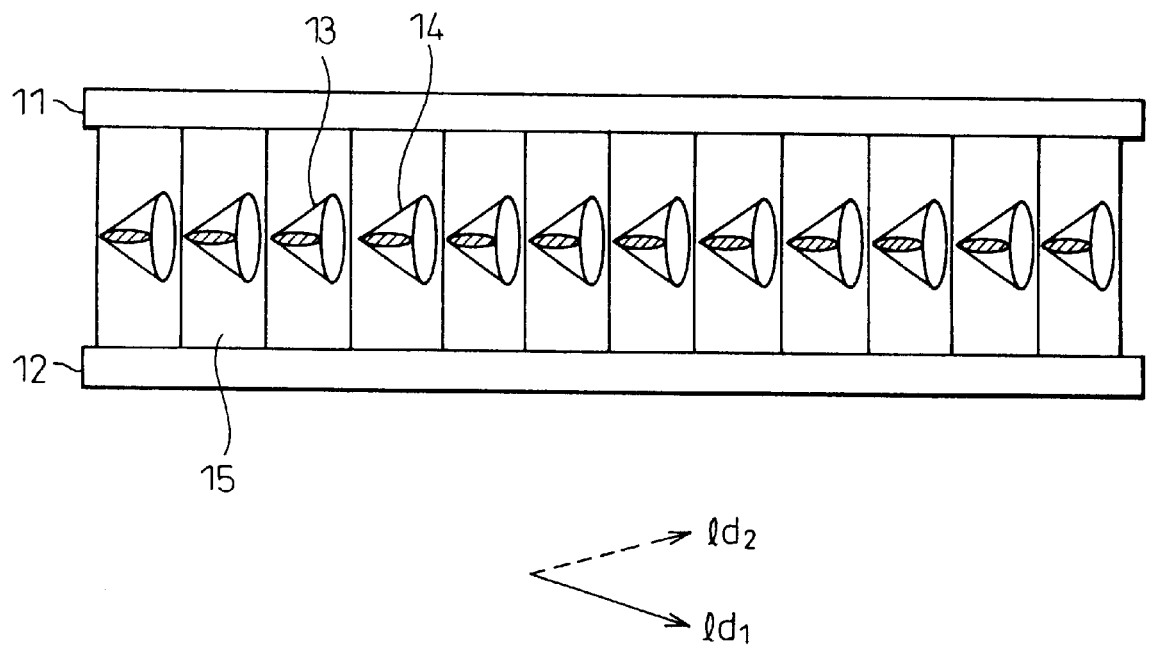
FIG. 8 is a diagram schematically showing the inside of a liquid crystal panel constructed using monostable ferroelectric liquid crystal.

FIG. 8 is a diagram schematically showing the inside of a liquid crystal panel constructed using a monostable ferroelectric liquid crystal (hereinafter called the monostable FLC) material. Conventional ferroelectric liquid crystals exhibit nematic, smectic A, and smectic C phases, depending on the temperature, but the monostable FLC does not have the smectic A phase. As a result, two layer normal directions exist in a mixed fashion. To eliminate this mixed state, when a voltage is applied during a transition from the nematic phase to the smectic C phase, the layer normal is oriented in either one of the directions, thus exhibiting a monostable characteristic.

Noting the liquid crystal cones 13 aligned in a direction parallel to the substrates 11 and 12 in FIG. 8, it is seen that the monostable ferroelectric liquid crystal molecules 14 are lying on the same sides of the liquid crystal cones, either one side or the opposite side of each cone. When viewed from above the upper substrate, the average optical axis direction is tilted relative to the smectic layer normal, as shown in FIG. 8. In FIG. 8, the solid line indicates the optical axis direction 1$d$1 when the liquid crystal molecules are lying on one side of each cone, and the dashed line the optical axis direction 1$d$2 when the liquid crystal molecules are lying on the opposite side.

Figure 9:
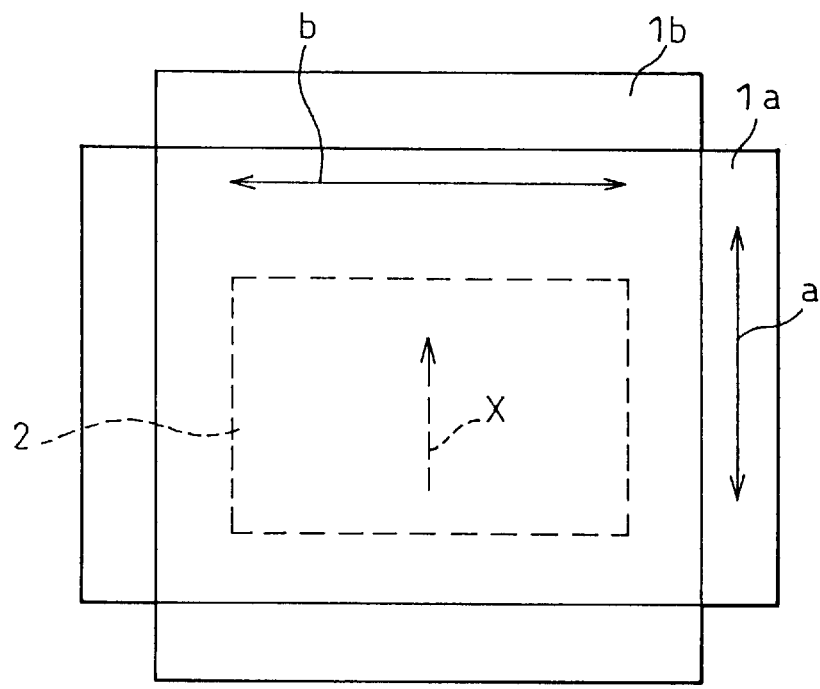
FIG. 9 is a diagram showing a typical arrangement of polarizers in the liquid crystal panel constructed using the monostable ferroelectric liquid crystal.

FIG. 9 is a diagram showing a typical arrangement of polarizers in the liquid crystal panel constructed using the monostable FLC material. As shown, the liquid crystal cell 2 is placed between the polarizers 1a and 1b whose polarization axes a and b are arranged in a crossed Nicol configuration, the liquid crystal cell being set up so that the long axis direction X, either the optical axis direction 1$d$1 or 1$d$2, of the monostable ferroelectric liquid crystal molecules in the absence of an applied voltage is substantially parallel to the polarization axis of either one of the polarizers, and so that it can produce a white display state (transmission state) and a black display state (non-transmission state).

Figure 10:
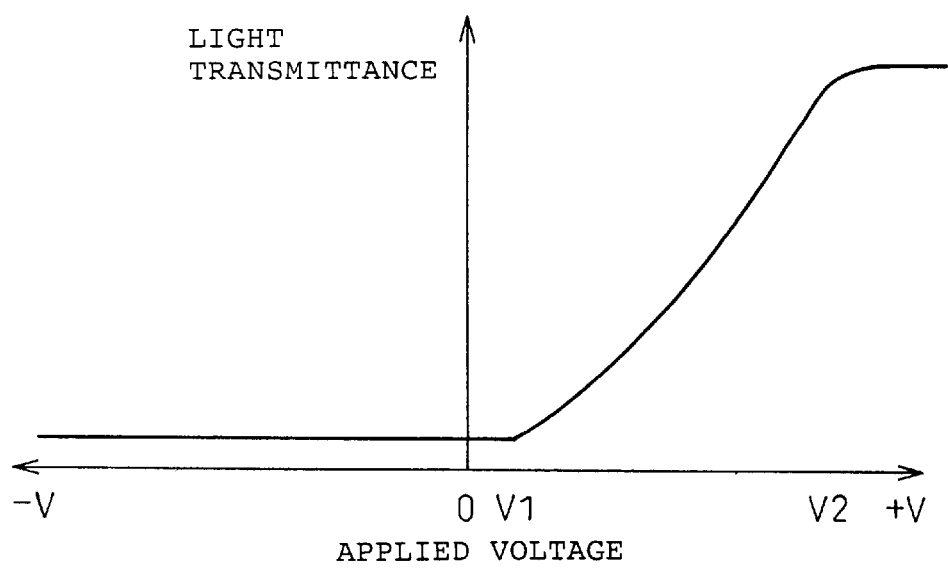
FIG. 10 is a diagram showing an applied voltage versus transmittance relationship for the monostable ferroelectric liquid crystal panel.

FIG. 10 is a diagram showing how the transmittance varies with the applied voltage when the voltage is applied to the monostable FLC panel of the above construction. The monostable FLC panel does not have memory characteristics, and in the absence of an applied voltage, the long axes of the liquid crystal molecules are all pointed in the same direction. When a voltage is applied as shown in FIG. 10, the liquid crystal molecules move in a manner dependent on the magnitude of the applied voltage. As shown, when a positive voltage is applied and increased in the positive direction, the light transmittance of the monostable FLC panel begins to increase when the applied voltage reaches V1, and saturates when it reaches V2. Here, the applied voltage can be interchanged with the width of the applied pulse, the height of the pulse, or the number of pulses applied.

Figure 1:
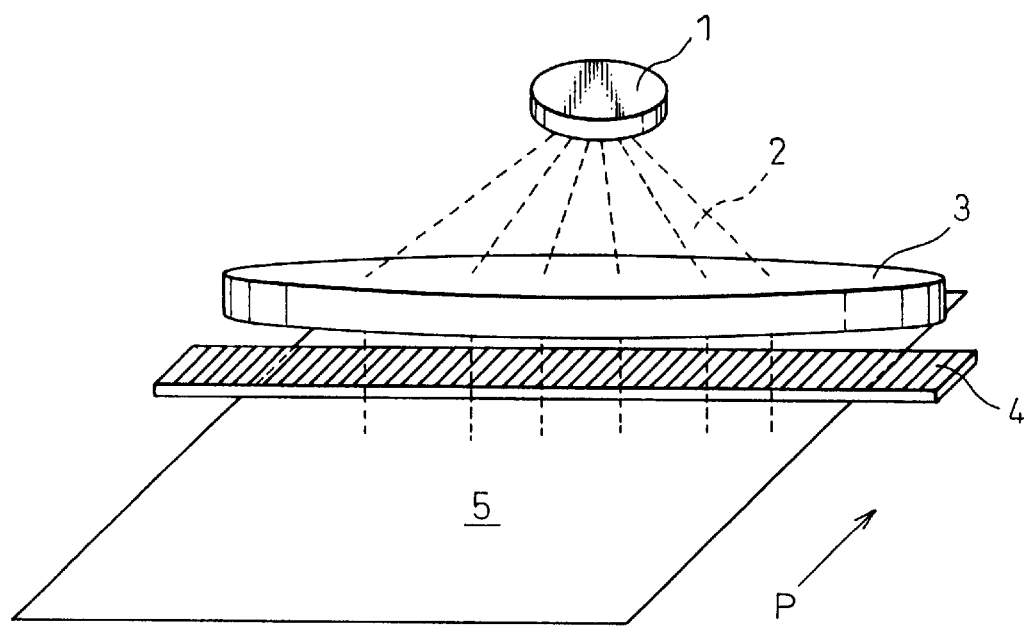
FIG. 1 is a schematic diagram showing a printer that uses a liquid crystal shutter.

The preferred embodiments of the present invention will be described in detail below with reference to drawings. The present invention can be applied to a conventional printer equipped with a liquid crystal shutter. One example of the conventional printer has previously be shown in FIG. 1. The liquid crystal panel of the present invention can be applied for use as the liquid crystal shutter shown in FIG. 1.

Figure 11:
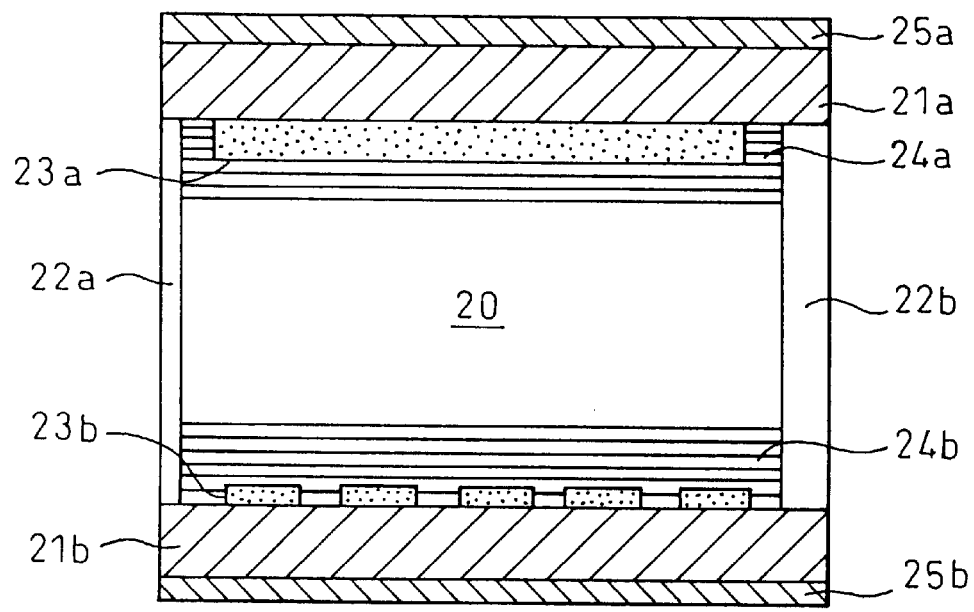
FIG. 11 is a diagram showing a structure of the liquid crystal panel used in the present invention.

FIG. 11 is a diagram showing the structure of the liquid crystal panel used in the embodiments hereinafter described. The liquid crystal panel used in the embodiments comprises a pair of glass substrates 21a and 21b holding therebetween a liquid crystal layer 20 about 1.7 μm in thickness. On the opposing surfaces of the glass substrates are formed electrodes 23a and 23b, which are coated with polymeric alignment films 24a and 24b, respectively, and are treated with rubbing. On the outside surface of one glass substrate is disposed a first polarizer 25a with its polarization axis oriented parallel to the average molecular axis direction of liquid crystal molecules in the absence of an applied voltage, while on the outside surface of the other glass substrate, a second polarizer 25b is arranged with its polarization axis oriented at 90° to the polarization axis of the first polarizer 25a.

Figure 12:
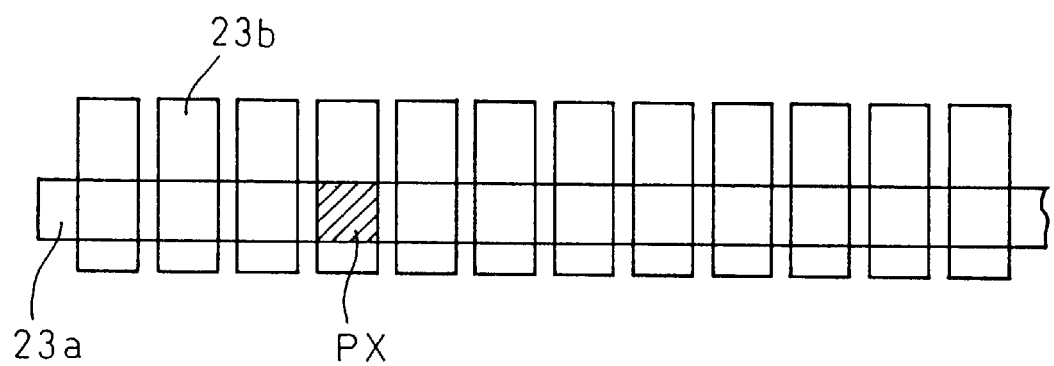
FIG. 12 is a diagram showing an electrode arrangement in the liquid crystal panel used in the present invention.

FIG. 12 shows the arrangement of the transparent electrodes used in the embodiments hereinafter described. The electrodes consist of 1200 pixel electrodes 23b (only 12 electrodes shown) and one counter electrode 23a. Each pixel px is supplied with a voltage equal to the sum of the voltage applied to its associated pixel electrode and the voltage applied to the counter electrode.

[Embodiment 1—DHF Liquid Crystal Panel]

Figure 13:
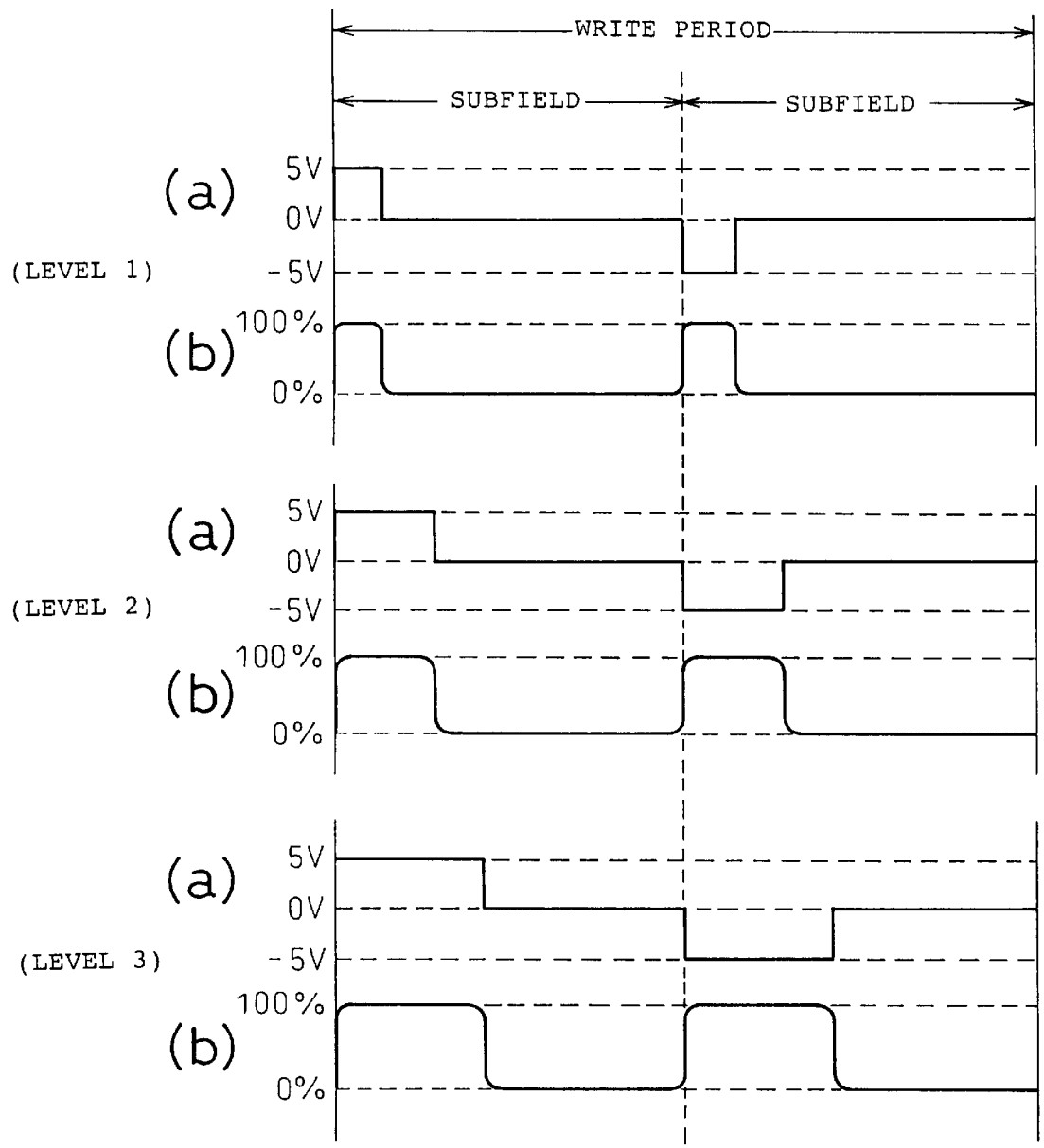
FIG. 13 is a diagram showing driving voltage waveforms and transmittance curves for a DHF liquid crystal panel according to a first embodiment of the present invention.

FIG. 13 is a diagram showing liquid crystal driving waveforms and their corresponding light transmitting states according to the present embodiment. In the figure, part (a) shows the voltage waveform applied to a pixel, and part (b) the light transmittance. The driving waveforms and transmitting states are shown for various levels of grayscale data. The same definitions apply to the other embodiments described herein. The period for writing one line (write period) is divided into two subfields, i.e., the first and second subfields of equal length. In each of the first and second subfields, a single pulse is applied which is equal in width but opposite in polarity and symmetrical about 0 V to the single pulse applied in the other subfield. The single pulse is always applied at the beginning of each subfield.

The width of the single pulse was varied according to image data. In the case of data (level 1) for which the amount of time that the photoconductor is exposed to light (light transmitting period) needs to be reduced, the width of the single pulse was reduced to shorten the light transmitting period in the write period. In the case of data (level 2 or level 3) for which the amount of time that the photoconductor is exposed to light needs to be increased, the width of the single pulse was increased to lengthen the light transmitting period in the write period. The length of each write period was set to 1 ms, and the voltage value of the single pulse was set to +5 V or −5 V, respectively.

During the period in which the pulse is applied, the liquid crystal is in the transmitting state to transmit light therethrough, and thus the pixel appears white. On the other hand, during the period in which the pulse is not applied and the voltage is held at zero, the liquid crystal is in the non-transmitting state and does not pass light therethrough, and the pixel appears black. The ferroelectric liquid crystal called DHF type shutter used in the present invention responded with substantially the same speed for both the transmitting and non-transmitting states.

For any data, the driving waveform of the present invention applies in each subfield a single pulse opposite in polarity and symmetrical about 0 V to the single pulse applied in the other subfield, and the voltage is held constant at 0 V during the period other than the single-pulse application period. In this case, the voltage may be held constant at a voltage near 0 V, not at 0 V. This also applies to the other embodiments described hereinafter. Since the single pulses applied are opposite in polarity, DC voltage is prevented from being applied to the DHF liquid crystal for an extended period of time; as a result, the DHF liquid crystal can be operated continuously without causing damage to its helical structure. Furthermore, the length of each write period was 1 ms, and high-speed driving could be accomplished at all times. In FIG. 13, the single pulse was always applied at the beginning of each subfield, but the same effect was obtained when it was applied at the end of each subfield.

[Embodiment 2—DHF Liquid Crystal Panel]

Figure 14:
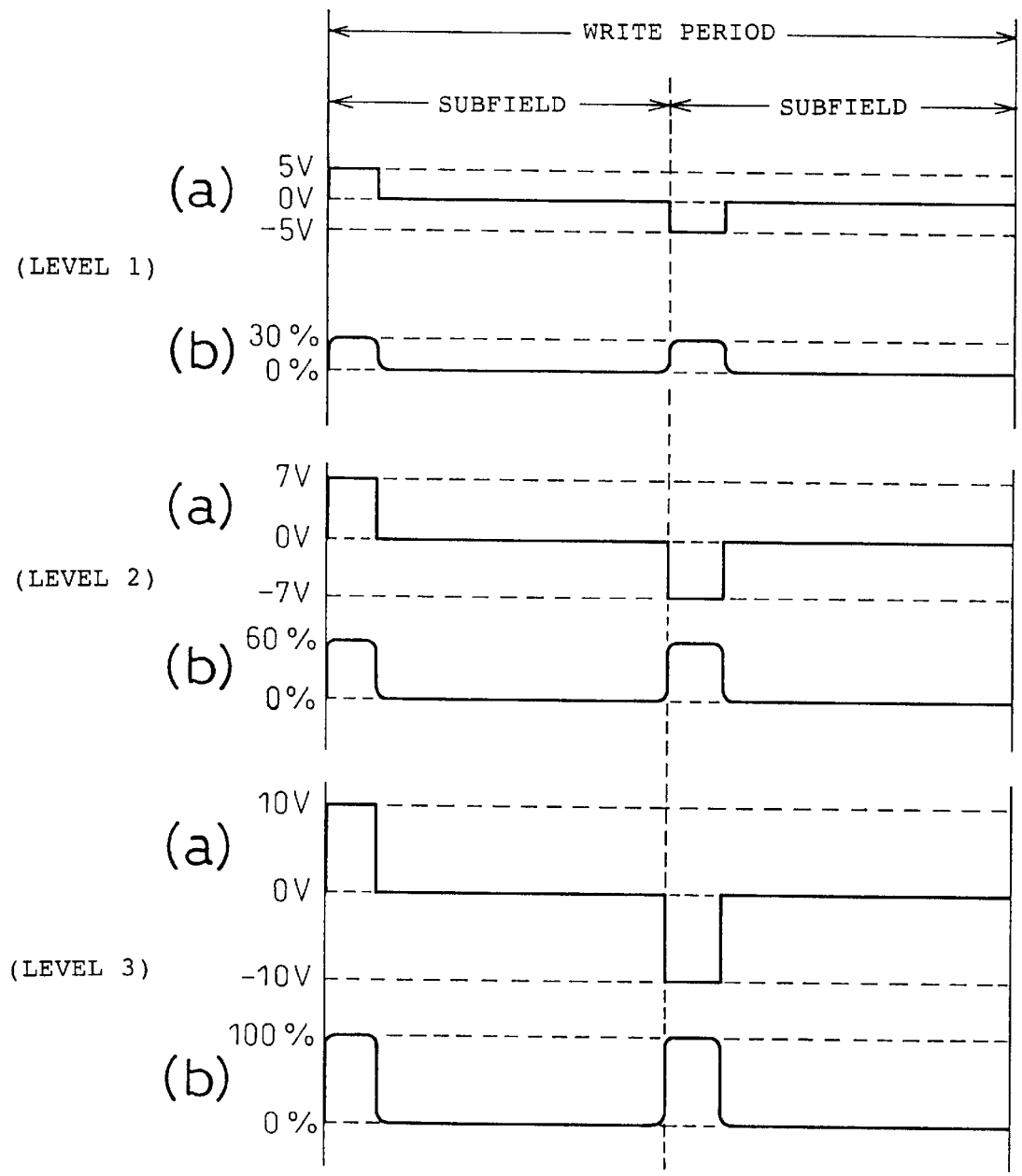
FIG. 14 is a diagram showing driving voltage waveforms and transmittance curves for a DHF liquid crystal panel according to a second embodiment of the invention.

FIG. 14 is a diagram showing driving waveforms and their corresponding light transmitting states for a DHF liquid crystal panel according to another embodiment. In the first embodiment shown in FIG. 13, the amount of light transmission was varied by varying the width of the single pulse, but in FIG. 14, the amount of light transmission is varied by varying the height of the single pulse. In the case of data (level 1) for which the amount of light to be shone on the photoconductor (the amount of light transmission) needs to be reduced, the height of the pulse is reduced, and a voltage of +5 V or −5 V is applied. In the case of data for which the amount of light to be shone on the photoconductor (the amount of light transmission) is large, the height of the single pulse is increased according to the amount of light required (level 2, level 3). As shown in FIG. 14, a single pulse of +7 V or −7 V was applied for level 2, and a single pulse of +10 V or −10 V was applied for level 3. The length of each write period was set to 1 ms.

In the case of the DHF liquid crystal panel, it is desirable that the period during which the sum voltage applied to the pixel is held at 0 V be increased for stabilization of the helical structure, but as long as the necessary length can be secured for that period, the number of pulses can be increased.

During the period in which the pulse is applied, the liquid crystal is in the transmitting state to transmit light therethrough, and thus the pixel appears white; on the other hand, during the period in which the pulse is not applied and the voltage is held at zero, the liquid crystal is in the non-transmitting state and does not pass light therethrough, and the pixel appears black. The ferroelectric liquid crystal called DHF type shutter used in the present invention responded with substantially the same speed for both the transmitting and non-transmitting states.

In the second embodiment, as in the first embodiment, for any data the driving waveform applies single pulses opposite in polarity and symmetrical about 0 V, and the voltage is held constant at 0 V during the period other than the single-pulse application period. In FIG. 14, the single pulse was always applied at the beginning of each subfield, but the same effect was obtained when it was applied at the end of each subfield.

[Embodiment 3—DHF Liquid Crystal Panel]

Figure 15:
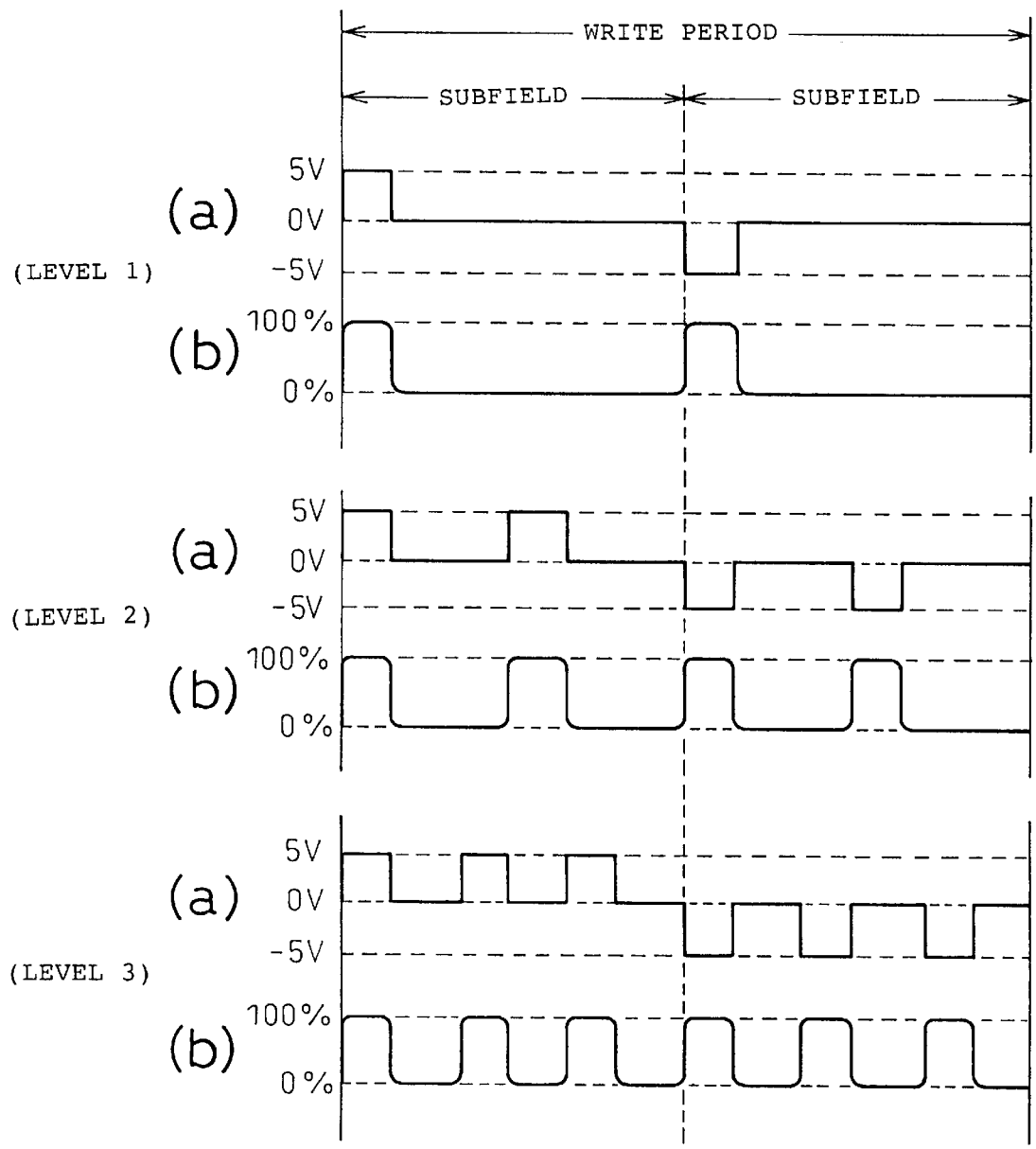
FIG. 15 is a diagram showing driving voltage waveforms and transmittance curves for a DHF liquid crystal panel according to a third embodiment of the invention.

FIG. 15 is a diagram showing driving waveforms and their corresponding light transmitting states for a DHF liquid crystal panel according to still another embodiment. In the first embodiment shown in FIG. 13, the amount of light transmission was varied by varying the width of the single pulse, but in FIG. 15, the amount of light transmission is varied by varying the number of pulses applied. In the case of data (level 1) for which the amount of light to be shone on the photoconductor (the amount of light transmission) needs to be reduced, the number of pulses is set to 1. In the case of data for which the amount of light to be shone on the photoconductor (the amount of light transmission) is large, the number of pulses is increased according to the amount of light required (level 2, level 3). As shown in FIG. 15, the number of pulses was set to 2 for level 2, and to 3 for level 3. Here, the number of pulses can be set as desired. The length of each write period was set to 1 ms.

During the period in which the pulse is applied, the liquid crystal is in the transmitting state to transmit light therethrough, and thus the pixel appears white; on the other hand, during the period in which the pulse is not applied and the voltage is held at zero, the liquid crystal is in the non-transmitting state and does not pass light therethrough, and the pixel appears black. The DHF liquid crystal shutter used in the present invention responded with substantially the same speed for both the transmitting and non-transmitting states.

In the third embodiment, as in the first embodiment, for any data the driving waveform applies single pulses symmetrical about 0 V, and the voltage is held constant at 0 V during the period other than the pulse application period.

[Embodiment 4—DHF Liquid Crystal Panel]

Figure 16:
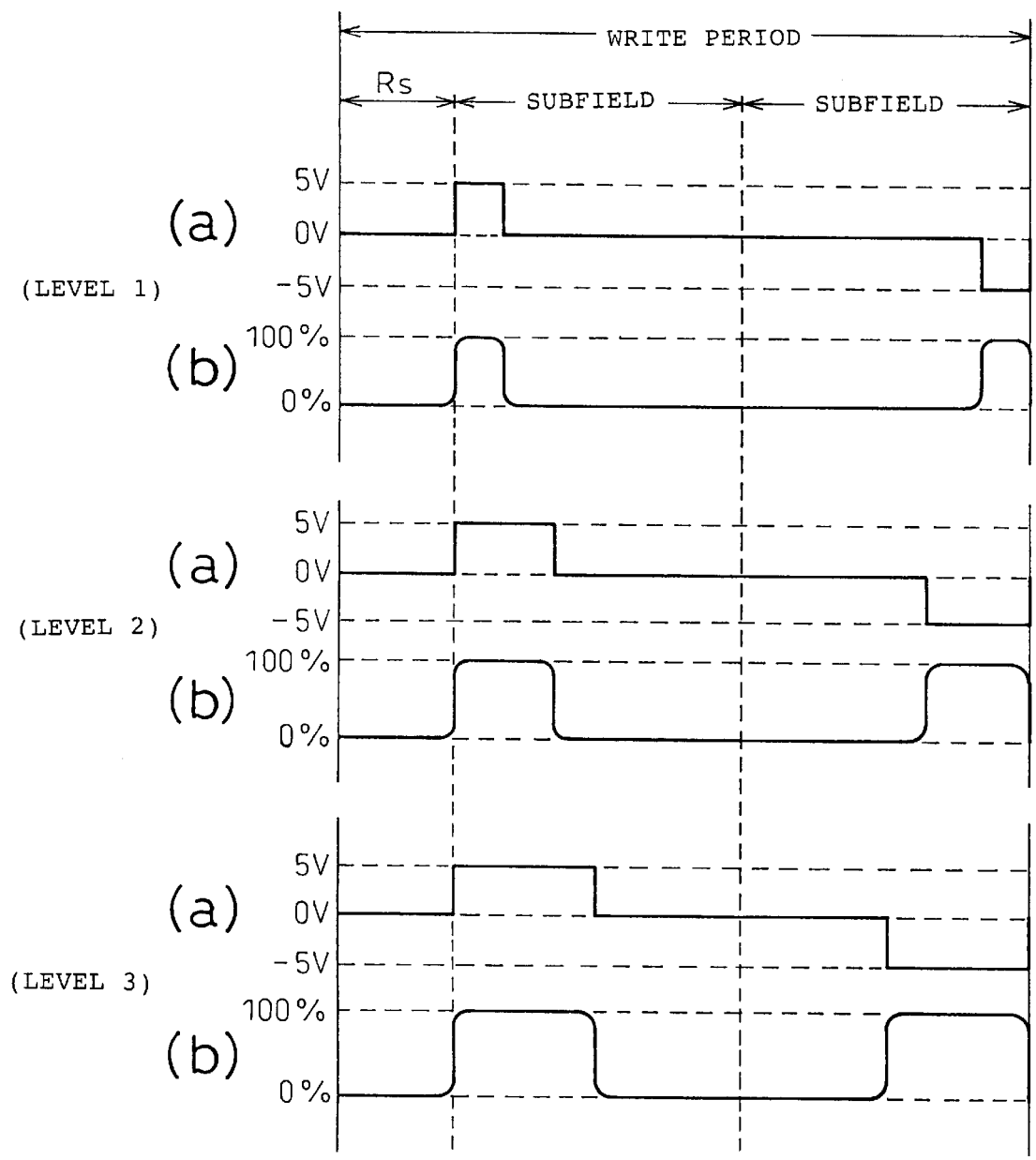
FIG. 16 is a diagram showing driving voltage waveforms and transmittance curves for a DHF liquid crystal panel according to a fourth embodiment of the invention.

FIG. 16 is a diagram showing driving waveforms and their corresponding light transmitting states for a DHF liquid crystal panel according to yet another embodiment. The driving waveforms and transmittance are shown for various levels of grayscale data. Each write period for writing one line of image data consists of a reset period and a subfield. The subfield is divided into two equal periods, the first period and the second period. In the reset period, a voltage of 0 V is applied, while in each subfield period, a single pulse is applied which is opposite in polarity and symmetrical about 0 V to the single pulse applied in the other subfield period. The width of the single pulse is the same for both the first and second subfield periods.

In this embodiment also, the pulse width was varied according to image data. In the case of data (level 1) for which the amount of time that the photoconductor is exposed to light (light transmitting period) needs to be reduced, the width of the single pulse was reduced to shorten the light transmitting period in the write period. In the case of data (level 2 or level 3) for which the amount of time that the photoconductor is exposed to light needs to be increased, the width of the single pulse was increased to lengthen the light transmitting period in the write period. The length of each write period was set to 1 ms, and the voltage value of the single pulse was set to +5 V or −5 V, respectively.

The reset period was provided at the beginning of the write period, and the voltage applied to the pixel was set to 0 V. In FIG. 16, the single-pulse application period is provided at the beginning of the first subfield and at the end of the second subfield, but in the preceding reset period, the voltage is always reset to 0 V before the single pulse is applied. This serves to stabilize the helical structure of the DHF liquid crystal, achieving a grayscale display of good reproducibility. In FIG. 16, the amount of light transmission was controlled by adjusting the width of the single pulse, but it can also be controlled by adjusting the height of the single pulse or the number of pulses applied.

When the helical structure is stabilized, the voltage applied during the reset period need not be set to 0 V. When the ferroelectric liquid crystal called DHF type shutter is one equipped with a light source, a more desirable non-transmitting state can be achieved by turning off the light source during the reset period, since light leakage can then be prevented.

[Embodiment 5—DHF Liquid Crystal Panel]

Figure 17:
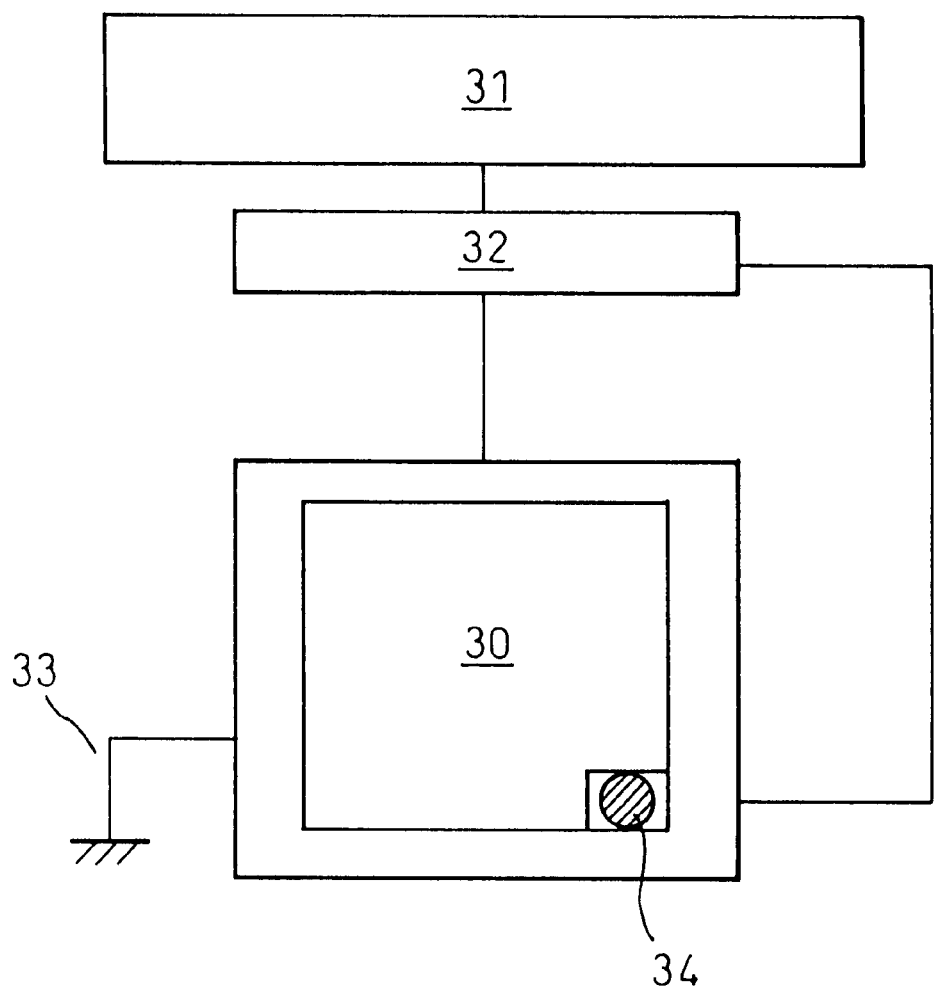
FIG. 17 is a block diagram of a driving circuit for a liquid crystal shutter used in the present invention.

FIG. 17 is a block diagram of a driving circuit for the DHF liquid crystal shutter used in the present invention. The DHF liquid crystal shutter of the present invention comprises a ferroelectric liquid crystal called DHF type panel 30, a grayscale data generating circuit 31, a pixel electrode voltage waveform control circuit 32, a counter electrode voltage waveform output section 33, and a temperature sensor 34. The pixel electrode voltage waveform control circuit 32 controls the voltage waveform applied to the pixel electrode. In this embodiment, since the voltage applied to the counter electrode is held constant at 0 V, the counter electrode voltage waveform output section 33 is not provided with a variable control circuit.

It has been found that in DHF liquid crystal, the helical structure of the liquid crystal exhibits distortion of varying degrees depending on the ambient temperature. In view of this, the temperature of the DHF liquid crystal panel 30 is constantly monitored by the temperature sensor 34, and the information is supplied to the pixel electrode voltage waveform control circuit 32 to control the voltage applied to the pixels in the DHF liquid crystal panel. With this circuit configuration, an optimum driving waveform appropriately controlled according to the temperature is applied to each pixel.

Figure 18:
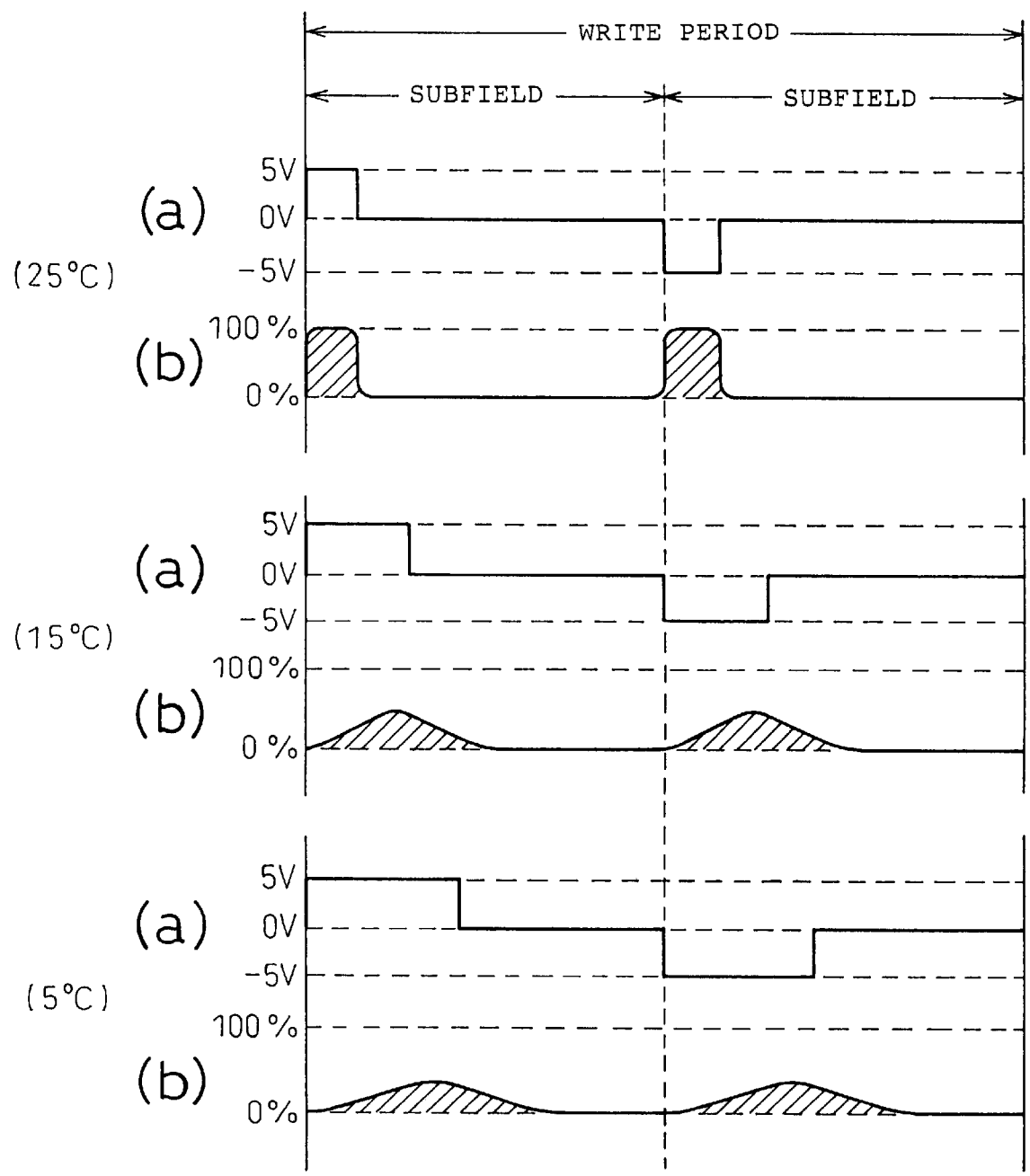
FIG. 18 is a diagram showing driving voltage waveforms and transmittance curves for various temperatures according to a fifth embodiment of the invention.

FIG. 18 is a diagram showing driving voltage waveforms and light transmitting states for the DHF liquid crystal panel for various temperatures according to the embodiment of the present invention. The driving waveforms shown in FIG. 18 are for the same grayscale level, but for different temperatures. Each write period for writing image data is divided into two subfields, i.e., first and second subfields of equal length. In FIG. 18, a reset period is not provided, although it may be provided, as appropriate. A single pulse is applied at the beginning of each of the first and second subfields, the single pulse being opposite in polarity and symmetrical about 0 V to the single pulse applied in the other subfield. The width of the single pulse is the same for the same temperature.

As the temperature of the ferroelectric liquid crystal called DHF type panel lowers, the degree of distortion of the DHF liquid crystal for the magnitude of the applied voltage decreases. As a result, if the same amount of light transmission is to be maintained even when the temperature is low, the width or height of the single pulse must be increased. On the other hand, as the temperature rises, the degree of distortion of the DHF liquid crystal for the magnitude of the applied voltage increases; as a result, to maintain the same amount of light transmission, the width or height of the single pulse is reduced.

In FIG. 18, the width of the single pulse is varied according to the temperature. As the temperature lowers from 25° C. to 15° C., and then to 5° C., for the same image data the width of the single pulse is correspondingly increased. In the figure, the shaded areas each represent the amount of light transmission; as can be seen, to maintain the same amount of light transmission despite changes in temperature, the width of the single pulse is varied in such a manner that the shaded area size remains the same.

By varying the width of the single pulse applied to the pixel electrode according to the temperature of the liquid crystal panel as described above, optimum grayscale display can be achieved regardless of the temperature. In this embodiment, the width of the single pulse was varied according to the temperature, but the same effect was obtained when the height of the single pulse or the number of pulses applied was varied.

[Embodiment 6—V-shaped Antiferroelectric Liquid Crystal Panel]

Figure 19:
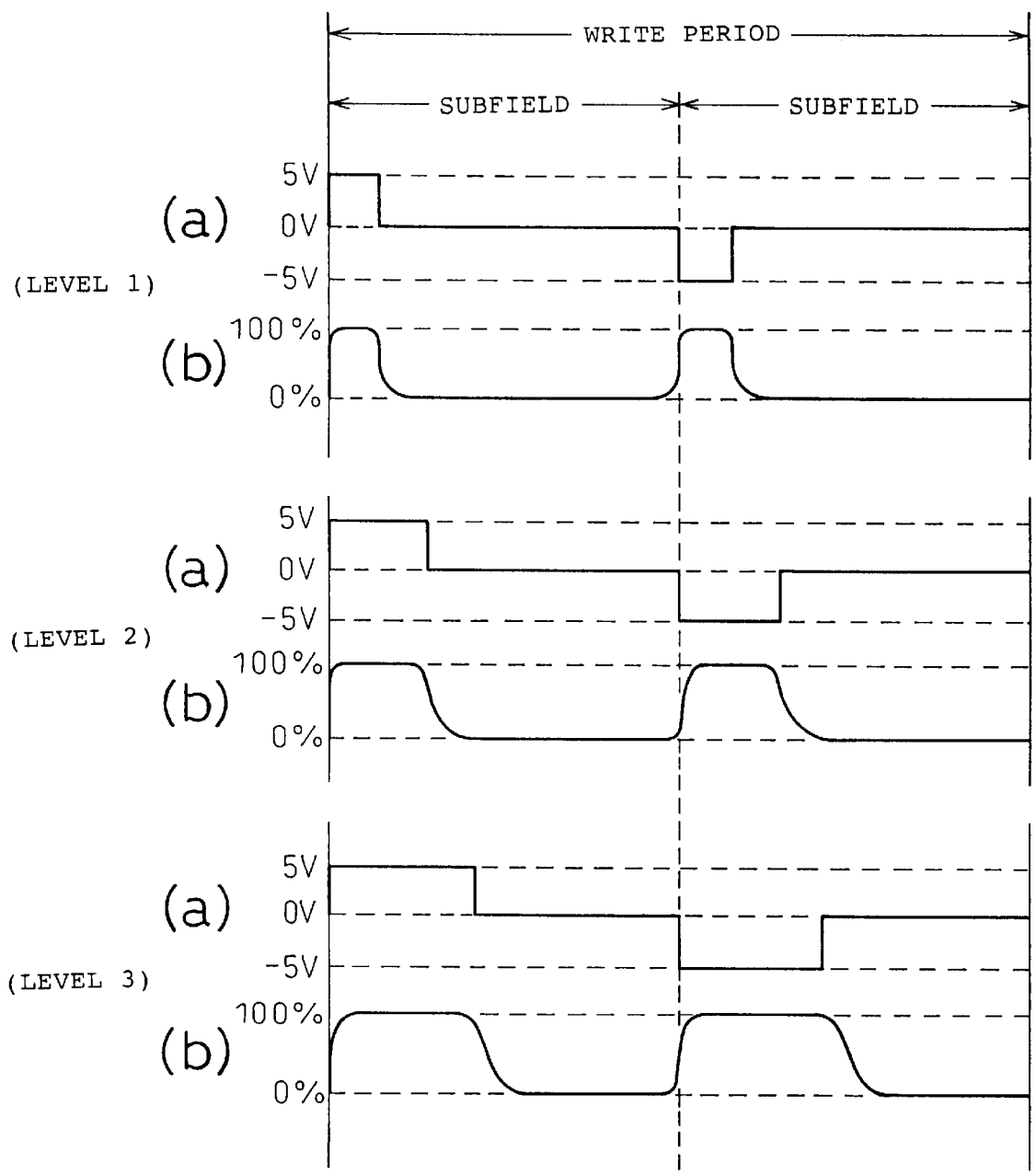
FIG. 19 is a diagram showing driving voltage waveforms and transmittance curves for a V-shaped antiferroelectric liquid crystal panel according to a sixth embodiment of the invention.

FIG. 19 is a diagram showing liquid crystal driving waveforms and light transmitting states for a V-shaped antiferroelectric liquid crystal panel according to the present invention. In the figure, part (a) shows the voltage waveform applied to a pixel, and part (b) the light transmittance. The period for writing one line (write period) is divided into two subfields, i.e., the first and second subfields of equal length. In each of the first and second subfields, a single pulse is applied which is equal in width but opposite in polarity and symmetrical about 0 V to the single pulse applied in the other subfield. Further, it is set so that the single pulse is always applied at the beginning of each subfield.

In FIG. 19, the differences of the driving waveforms and the light transmittance from those of the DHF liquid crystal panel are that it takes a longer time for the light transmittance to fall in response to the falling or rising of the single pulse, compared with the driving waveforms and light transmitting states shown in FIG. 13 for the DHF liquid crystal panel.

In this embodiment also, the amount of light transmission can be varied by varying the width of the single pulse according to image data. Further, the amount of light transmission can likewise be varied by varying the height of the single pulse or the number of pulses applied. The amount of light transmission can also be adjusted by using the driving circuit of FIG. 17 and varying the width or height of the pulse or the number of pulses according to the temperature.

Further, a reset period may be provided as shown in FIG. 16. In FIG. 19, the single pulse was always applied at the beginning of each subfield, but the same effect was obtained when it was applied at the end of each subfield.

Embodiment 7—V-shaped Antiferroelectric Liquid Crystal Panel

Figure 20:
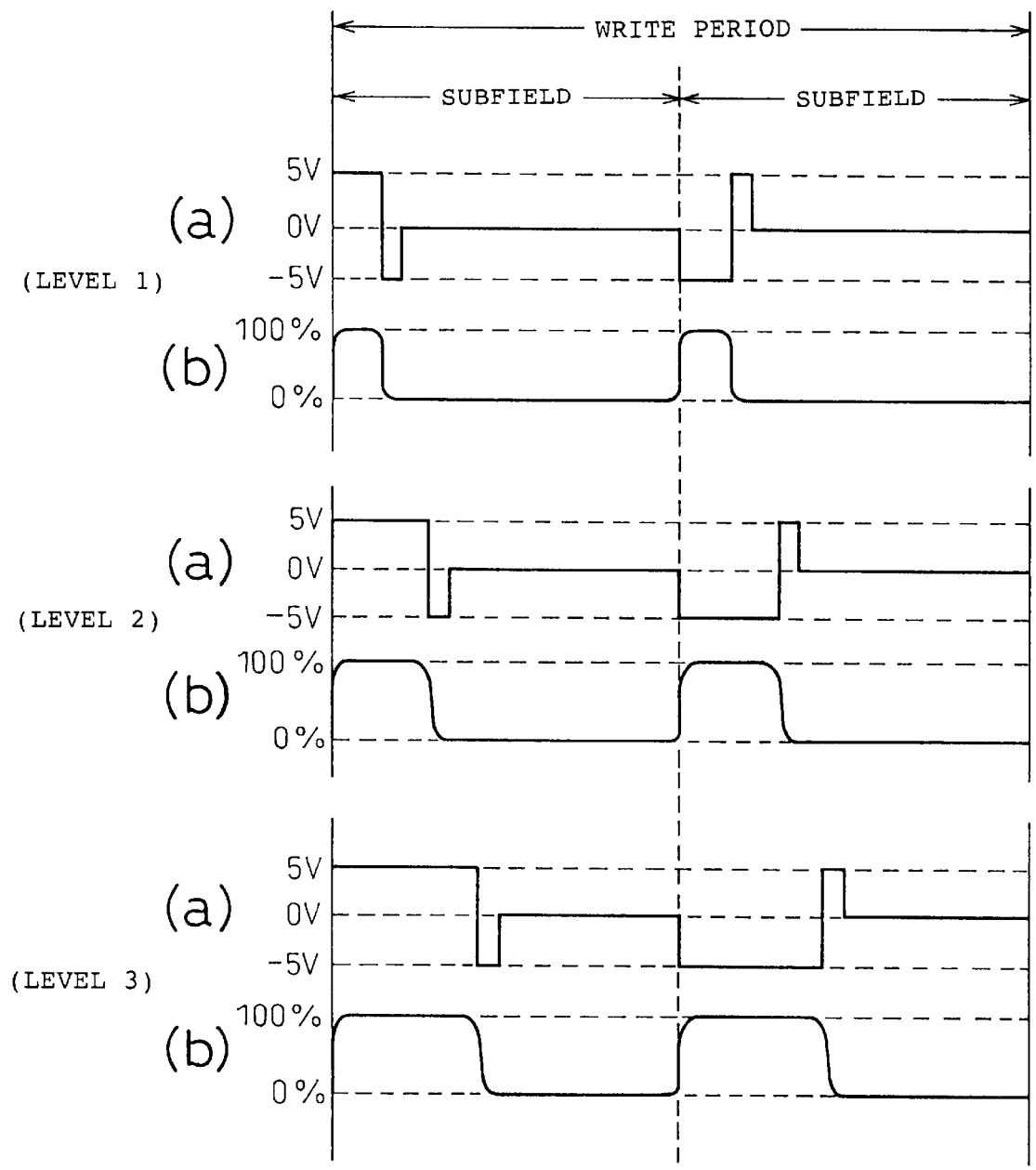
FIG. 20 is a diagram showing driving voltage waveforms and transmittance curves for a V-shaped antiferroelectric liquid crystal panel according to an seventh embodiment of the invention.

FIG. 20 is a diagram showing liquid crystal driving waveforms and their corresponding light transmitting states for a V-shaped antiferroelectric liquid crystal panel according to another embodiment. The difference of the driving waveform from the one of FIG. 19 is that each single pulse is immediately followed by a short pulse of opposite polarity.

In the case of the driving waveform shown in FIG. 19, the falling of the light transmittance is delayed in response to the falling or rising of the single pulse. The present embodiment improves on this point by applying a short pulse of opposite polarity immediately following the single pulse and thereby causing the light transmittance to fall without delay.

In this embodiment also, the amount of light transmission can be varied by varying the width of the single pulse according to image data. Further, the amount of light transmission can likewise be varied by varying the height of the single pulse. The amount of light transmission can also be varied by varying the number of pulses applied.

Further, a reset period may be provided as shown in FIG. 16. In FIG. 20, the single pulse was always applied at the beginning of each subfield, but the same effect was obtained when it was applied at the end of each subfield. It is also possible to vary the width or height of the pulse or the number of pulses according to the temperature.

[Embodiment 8—Monostable Ferroelectric Liquid Crystal Panel]

Figure 21:
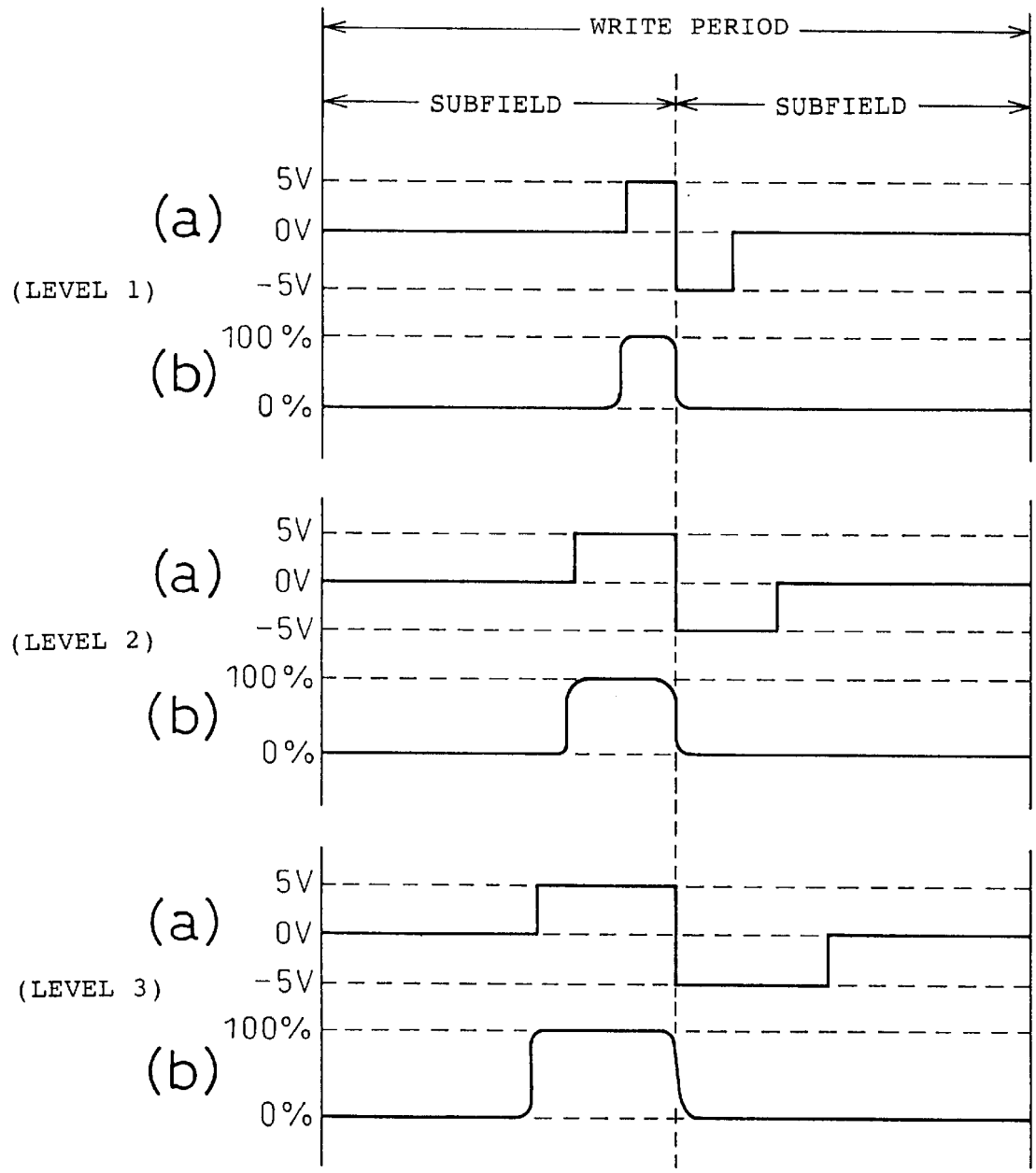
FIG. 21 is a diagram showing driving voltage waveforms and transmittance curves for a monostable ferroelectric liquid crystal panel according to an eighth embodiment of the invention.

FIG. 21 is a diagram showing liquid crystal driving waveforms and their corresponding light transmitting states for a monostable FLC panel according to the present invention. In the figure, part (a) shows the voltage waveform applied to a pixel, and (b) the light transmittance. The period for writing one line (write period) is divided into two subfields, i.e., first and second subfields of equal length. A positive single pulse is applied at the end of the first subfield, and immediately following that, a pulse of opposite polarity is applied at the beginning of the second subfield. The pulse width is the same for both the first and second subfields.

In the embodiment shown in FIG. 21, the positive and negative pulses are applied one immediately following the other in each write period. As can be seen from the graph shown in FIG. 10, when the positive pulse is applied, the liquid crystal is put in the transmitting state, but when the negative pulse is applied, the liquid crystal is not put in the transmitting state. The negative pulse is applied to apply a pulse of opposite polarity symmetric to the positive pulse with respect to 0 V. By applying the pulse in this way, the light transmittance can be caused to fall quickly in response to the falling of the pulse.

In this embodiment also, the amount of light transmission can be varied by varying the width of the single pulse according to image data. Further, the amount of light transmission can likewise be varied by varying the height of the single pulse. Further, a reset period may be provided as shown in FIG. 16. It is also possible to adjust the pulse width, etc. according to the temperature.

[Embodiment 9—Monostable Ferroelectric Liquid Crystal Panel]

Figure 22:
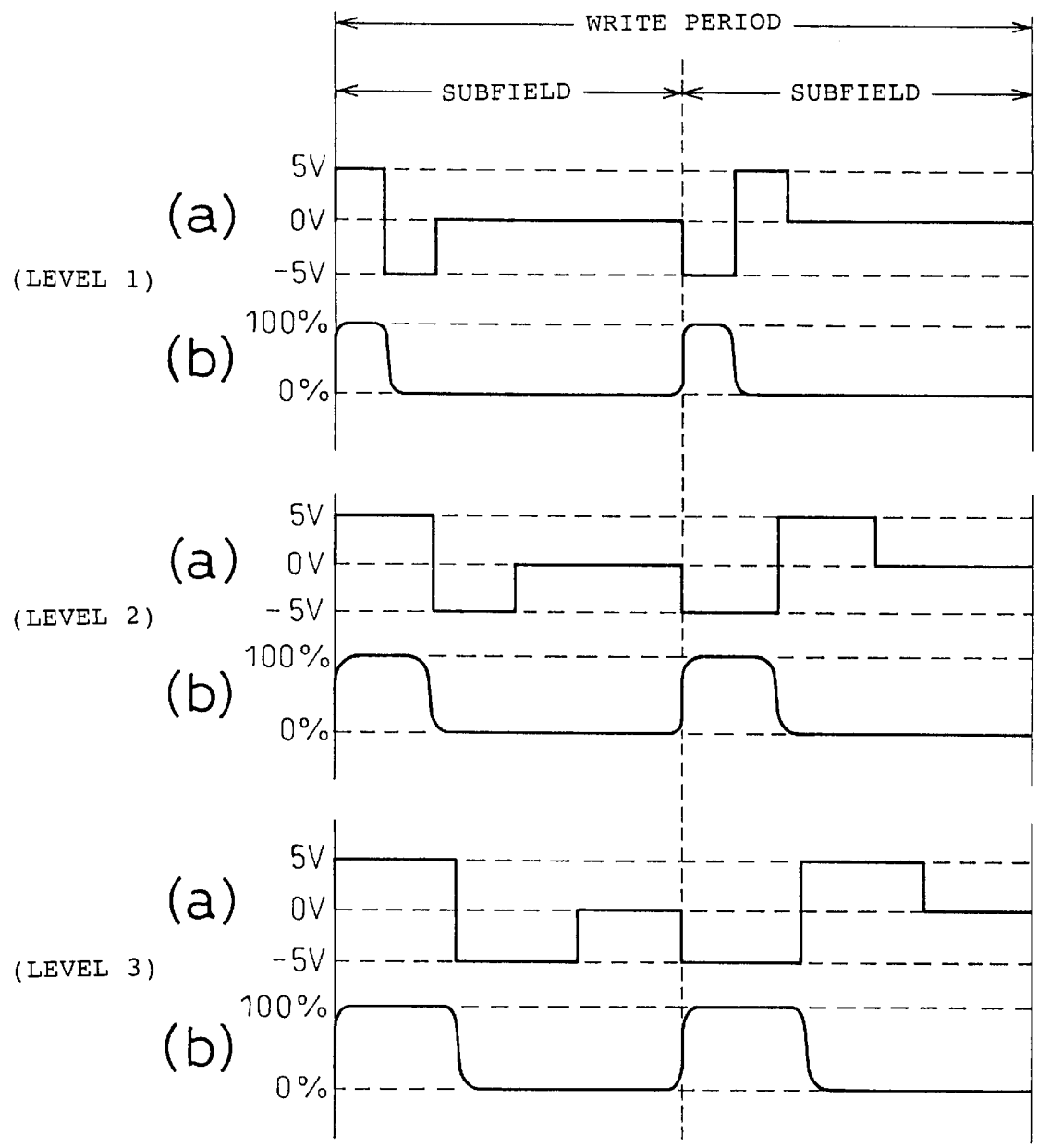
FIG. 22 is a diagram showing driving voltage waveforms and transmittance curves for a monostable ferroelectric liquid crystal panel according to a ninth embodiment of the invention.

FIG. 22 is a diagram showing liquid crystal driving waveforms and their corresponding light transmitting states for a monostable FLC panel according to another embodiment. The difference of the driving waveform from the one of FIG. 21 is that a positive single pulse is applied in the second subfield as well as in the first subfield. Here, as in the case of the driving waveform of FIG. 21, each single pulse is immediately followed by a pulse of opposite polarity.

In the case of the driving waveform shown in FIG. 22, the single pulse is applied at the beginning of each subfield, but it may be applied at the end of each subfield.

In this embodiment also, the amount of light transmission can be varied by varying the width of the single pulse according to image data. Further, the amount of light transmission can likewise be varied by varying the height of the single pulse. Further, a reset period may be provided as shown in FIG. 16. It is also possible to adjust the pulse width, height, etc. according to the temperature.

[Embodiment 10—Monostable Ferroelectric Liquid Crystal Panel]

Figure 23:
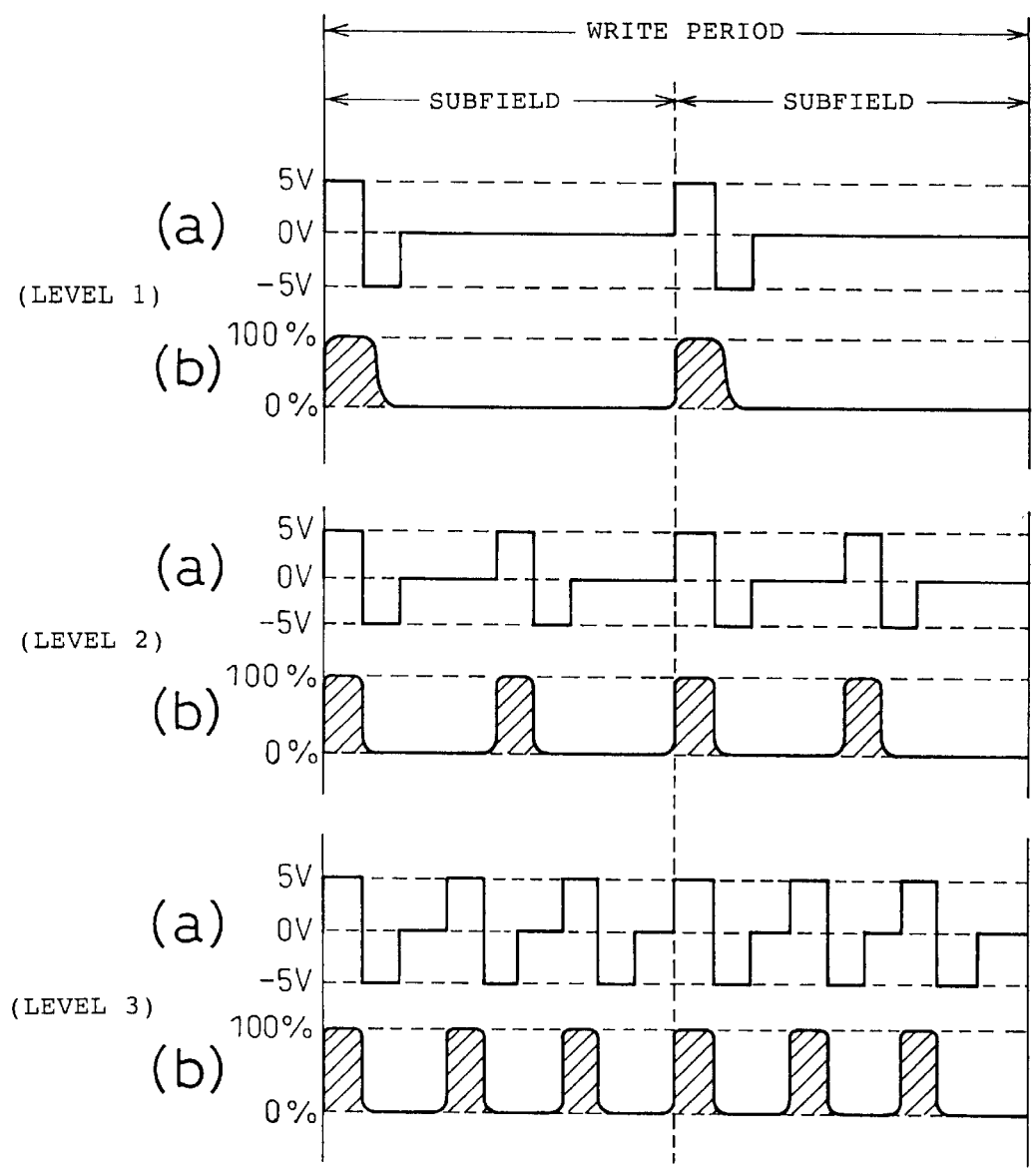
FIG. 23 is a diagram showing driving voltage waveforms and transmittance curves for a monostable ferroelectric liquid crystal panel according to a 10th embodiment of the invention.

The embodiment illustrated in FIG. 23 differs from the embodiment of FIG. 22 in that the amount of light transmission is varied by varying the number of pulses according to image data.

In this case, the amount of light transmission in each write period is represented by the sum of the shaped area sizes.

In this embodiment also, a reset period may be provided. It is also possible to adjust the number of pulses according to the temperature.

The embodiments of the invention described above can be summarized as follows.

The present invention concerns a liquid crystal shutter that uses as a shutter a liquid crystal panel constructed by sandwiching a DHF liquid crystal between a pair of substrates provided with a pixel electrode and a counter electrode, wherein a driving waveform for the panel has a write period comprising two subfields, and wherein in each of the subfields, a single pulse is applied to a pixel, the single pulse applied in one subfield being opposite in polarity to the single pulse applied in the other subfield, and a constant voltage of 0 V or close to 0 V is applied to the pixel during a period in which neither of the single pulses is applied.

The pixel electrode consists of a plurality of electrodes, and the counter electrode consists of one electrode. A single pulse is applied to the pixel electrode, a constant voltage of 0 V or close to 0 V is applied to the counter electrode, and a sum voltage representing the sum of the voltages applied to the both electrodes is applied to the pixel.

The single pulse is applied at the beginning or at the end of each of the subfields, and the amount of light transmission of the liquid crystal panel is controlled by controlling the width or height of the single pulse.

Instead of the single pulse, one or more than one pulse is applied to the pixel in each subfield, and the amount of light transmission of the liquid crystal panel is controlled by controlling the number of pulses applied.

A reset period during which the sum voltage applied to the pixel is held constant at or near 0 V may be provided immediately preceding the write period.

The liquid crystal panel is provided with a temperature sensor and a device for varying the width or height of the single pulse in accordance with a change in the temperature of the liquid crystal panel.

The device increases the width or height of the single pulse when the temperature of the liquid crystal panel lowers, and reduces the width or height of the single pulse when the temperature of the liquid crystal panel rises.

Alternatively, the liquid crystal panel is provided with a temperature sensor and a device for varying the number of pulses in accordance with a change in the temperature of the liquid crystal panel.

The device increases the number of pulses when the temperature of the liquid crystal panel lowers, and reduces the number of pulses when the temperature of the liquid crystal panel rises.

Further, the liquid crystal shutter of the present invention is used as the liquid crystal shutter in a printer that is equipped with a liquid crystal shutter using a liquid crystal panel as a shutter for controlling light transmission by opening or closing in accordance with a data signal, and that forms an image corresponding to the data signal by projecting transmitted light onto a photoconductor.

The invention also concerns a liquid crystal shutter that uses as a shutter a liquid crystal panel constructed by sandwiching a V-shaped antiferroelectric liquid crystal between a pair of substrates provided with a pixel electrode and a counter electrode, wherein a driving waveform for the panel has a write period comprising two subfields, and wherein in each of the subfields, a single pulse is applied to a pixel, the single pulse applied in one subfield being opposite in polarity to the single pulse applied in the other subfield, and a constant voltage of 0 V or close to 0 V is applied to the pixel during a period in which neither of the single pulses is applied.

Each single pulse is followed immediately by a pulse smaller in width and opposite in polarity to the single pulse.

The pixel electrode consists of a plurality of electrodes, and the counter electrode consists of one electrode. A single pulse is applied to the pixel electrode, a constant voltage of 0 V or close to 0 V is applied to the counter electrode, and a sum voltage representing the sum of the voltages applied to the both electrodes is applied to the pixel.

The single pulse is applied at the beginning or at the end of each of the subfields, and the amount of light transmission of the liquid crystal panel is controlled by controlling the width or height of the single pulse.

Instead of the single pulse, one or more than one pulse is applied to the pixel in each subfield, and the amount of light transmission of the liquid crystal panel is controlled by controlling the number of pulses applied.

A reset period during which the sum voltage applied to the pixel is held constant at or near 0 V may be provided immediately preceding the write period.

The liquid crystal panel is provided with a temperature sensor and a device for varying the width or height of the single pulse in accordance with a change in the temperature of the liquid crystal panel.

The device increases the width or height of the single pulse when the temperature of the liquid crystal panel lowers, and reduces the width or height of the single pulse when the temperature of the liquid crystal panel rises.

Alternatively, the liquid crystal panel is provided with a temperature sensor and a device for varying the number of pulses in accordance with a change in the temperature of the liquid crystal panel.

The device increases the number of pulses when the temperature of the liquid crystal panel lowers, and reduces the number of pulses when the temperature of the liquid crystal panel rises.

Further, the liquid crystal shutter of the present invention is used as the liquid crystal shutter in a printer that is equipped with a liquid crystal shutter using a liquid crystal panel as a shutter for controlling light transmission by opening or closing in accordance with a data signal, and that forms an image corresponding to the data signal by projecting transmitted light onto a photoconductor.

The invention further concerns a liquid crystal shutter that uses as a shutter a liquid crystal panel constructed by sandwiching a monostable ferroelectric liquid crystal between a pair of substrates provided with a pixel electrode and a counter electrode, wherein a driving waveform for the panel has a write period comprising two subfields, and wherein a first single pulse for making a pixel transparent to light is applied at the end of the first subfield, a second single pulse, opposite in polarity to the first single pulse, for not making the pixel transparent to light is applied at the beginning of the second subfield, and a constant voltage of 0 V or close to 0 V is applied to the pixel during a period in which neither of the single pulses is applied.

Alternatively, the invention concerns a liquid crystal shutter that uses as a shutter a liquid crystal panel constructed by sandwiching a monostable ferroelectric liquid crystal between a pair of substrates provided with a pixel electrode and a counter electrode, wherein a driving waveform for the panel has a write period comprising two subfields, and wherein a pair of pulses consisting of a first single pulse for making a pixel transparent to light and a second single pulse, opposite in polarity to the first single pulse, for not making the pixel transparent to light are applied in each of the subfields, and a constant voltage of 0 V or close to 0 V is applied to the pixel during a period in which neither of the pairs of single pulses is applied.

The pixel electrode consists of a plurality of electrodes, and the counter electrode consists of one electrode. A single pulse is applied to the pixel electrode, a constant voltage of 0 V or close to 0 V is applied to the counter electrode, and a sum voltage representing the sum of the voltages applied to the both electrodes is applied to the pixel.

The single pulse is applied at the beginning or at the end of each of the subfields, and the amount of light transmission of the liquid crystal panel is controlled by controlling the width or height of the single pulse.

Instead of the single pulse, one or more than one pulse is applied to the pixel in each subfield, and the amount of light transmission of the liquid crystal panel is controlled by controlling the number of pulses applied.

A reset period during which the sum voltage applied to the pixel is held constant at or near 0 V may be provided immediately preceding the write period.

The liquid crystal panel is provided with a temperature sensor and a device for varying the width or height of the single pulse in accordance with a change in the temperature of the liquid crystal panel.

The device increases the width or height of the single pulse when the temperature of the liquid crystal panel lowers, and reduces the width or height of the single pulse when the temperature of the liquid crystal panel rises.

Alternatively, the liquid crystal panel is provided with a temperature sensor and a device for varying the number of pulses in accordance with a change in the temperature of the liquid crystal panel.

The device increases the number of pulses when the temperature of the liquid crystal panel lowers, and reduces the number of pulses when the temperature of the liquid crystal panel rises.

Further, the liquid crystal shutter of the present invention is used as the liquid crystal shutter in a printer that is equipped with a liquid crystal shutter using a liquid crystal panel as a shutter for controlling light transmission by opening or closing in accordance with a data signal, and that forms an image corresponding to the data signal by projecting transmitted light onto a photoconductor.

What is claimed is:

1. A liquid crystal shutter that uses as a shutter a liquid crystal panel constructed by sandwiching DHF liquid crystal between a pair of substrates provided with one or more pixel electrodes and one or more counter electrodes, wherein a driving waveform for said panel has a write period comprising two subfields, and wherein in each of said subfields, a single pulse is applied to a pixel, the single pulse applied in one subfield being opposite in polarity to the single pulse applied in the other subfield, and a constant voltage of 0 V or close to 0 V is applied to the pixel during a period in which neither of said single pulses is applied.

2. A liquid crystal shutter that uses as a shutter a liquid crystal panel constructed by sandwiching V-shaped antiferroelectric liquid crystal between a pair of substrates provided with one or more pixel electrodes and one or more counter electrodes, wherein a driving waveform for said panel has a write period comprising two subfields, and wherein in each of said subfields, a single pulse is applied to a pixel, the single pulse applied in one subfield being opposite in polarity to the single pulse applied in the other subfield, and a constant voltage of 0 V or close to 0 V is applied to the pixel during a period in which neither of said single pulses is applied.

3. A liquid crystal shutter as claimed in claim 2, wherein a single pulse which is smaller in width and opposite in polarity is applied just after each of said single pulses are applied.

4. A liquid crystal shutter that uses as a shutter a liquid crystal panel constructed by sandwiching monostable ferroelectric liquid crystal between a pair of substrates provided with one or more pixel electrodes and one or more counter electrodes, wherein a driving waveform for said panel has a write period comprising two subfields, and wherein a first single pulse for making a pixel transparent to light is applied at the end of the first subfield, a second single pulse, opposite in polarity to said first single pulse, for not making the pixel transparent to light is applied at the beginning of the second subfield, and a constant voltage of 0 V or close to 0 V is applied to the pixel during a period in which neither of said single pulses is applied.

5. A liquid crystal shutter that uses as a shutter a liquid crystal panel constructed by sandwiching monostable ferroelectric liquid crystal between a pair of substrates provided with one or more pixel electrodes and one or more counter electrodes, wherein a driving waveform for said panel has a write period comprising two subfields, and wherein a pair of pulses consisting of a first single pulse for making a pixel transparent to light and a second single pulse, opposite in polarity to said first single pulse, for not making the pixel transparent to light are applied in each of said subfields, and a constant voltage of 0 V or close to 0 V is applied to the pixel during a period in which neither of said pairs of single pulses is applied.

6. A liquid crystal shutter as claimed in any one of claims 1 to 5, wherein said pixel electrode comprises a plurality of electrodes, and said counter electrode comprises one electrode.

7. A liquid crystal shutter as claimed in claim 6, wherein a single pulse is applied to said pixel electrodes, a constant voltage of 0 V or close to 0 V is applied to said counter electrode, and a sum voltage representing the sum of the voltages applied to said both electrodes is applied to said pixel.

8. A liquid crystal shutter as claimed in claim 1, 2, 3, or 5, wherein said single pulse is applied at the beginning or at the end of each of said subfields.

9. A liquid crystal shutter as claimed in any one of claims 1 to 5, wherein the amount of light transmission of said liquid crystal panel is controlled by controlling the width or height of said single pulse.

10. A liquid crystal shutter as claimed in claim 1, 2, 3, or 5, wherein instead of said single pulse, one or more than one pulse is applied to the pixel in each of said subfields, and the amount of light transmission of said liquid crystal panel is controlled by controlling the number of applied pulses.

11. A liquid crystal shutter as claimed in any one of claims 1 to 5, wherein a reset period during which a sum voltage applied to said pixel is held constant at or near 0 V is provided immediately preceding said write period.

12. A liquid crystal shutter as claimed in any one of claims 1 to 5, wherein said liquid crystal panel is provided with a temperature sensor and a device for varying the width or height of said single pulse in accordance with a change in the temperature of said liquid crystal panel.

13. A liquid crystal shutter as claimed in claim 12, wherein said device increases the width or height of said single pulse when the temperature of said liquid crystal panel lowers, and reduces the width or height of said single pulse when the temperature of said liquid crystal panel rises.

14. A liquid crystal shutter as claimed in claim 10, wherein said liquid crystal panel is provided with a temperature sensor and a device for varying said number of pulses in accordance with a change in the temperature of said liquid crystal panel.

15. A liquid crystal shutter as claimed in claim 14, wherein said device increases said number of pulses when the temperature of said liquid crystal panel lowers, and reduces said number of pulses when the temperature of said liquid crystal panel rises.

16. A printer which is equipped with a liquid crystal shutter using a liquid crystal panel as a shutter for controlling light transmission by opening or closing in accordance with a data signal, and which forms an image corresponding to said data signal by projecting transmitted light onto a photoconductor, wherein the liquid crystal shutter described in any one of claims 1 to 5 is used as said liquid crystal shutter.

* * * * *